United States Patent
Yang et al.

(10) Patent No.: US 10,360,470 B2
(45) Date of Patent: Jul. 23, 2019

(54) IMPLEMENTATION OF MOBILENET IN A CNN BASED DIGITAL INTEGRATED CIRCUIT

(71) Applicant: GYRFALCON TECHNOLOGY INC., Milpitas, CA (US)

(72) Inventors: Lin Yang, Milpitas, CA (US); Patrick Z. Dong, San Jose, CA (US); Jason Z. Dong, San Jose, CA (US); Baohua Sun, Fremont, CA (US)

(73) Assignee: Gyrfalcon Technology Inc., Milpitas, CA (US)

( * ) Notice: Subject to any disclaimer, the term of this patent is extended or adjusted under 35 U.S.C. 154(b) by 0 days.

(21) Appl. No.: 15/910,005

(22) Filed: Mar. 2, 2018

(65) Prior Publication Data

US 2018/0189595 A1    Jul. 5, 2018

Related U.S. Application Data

(63) Continuation-in-part of application No. 15/709,220, filed on Sep. 19, 2017, now Pat. No. 10,083,171, (Continued)

(51) Int. Cl.
*G06K 9/46*    (2006.01)
*G06K 9/62*    (2006.01)
(Continued)

(52) U.S. Cl.
CPC ....... *G06K 9/4628* (2013.01); *G06K 9/00986* (2013.01); *G06K 9/6217* (2013.01); (Continued)

(58) Field of Classification Search
CPC .............. G06F 17/274; G06F 17/2765; G06F 17/2863; G06F 17/2775; G06F 17/2785; (Continued)

(56) References Cited

U.S. PATENT DOCUMENTS 5,140,670 A    8/1992    Chua et al.
5,355,528 A    10/1994    Roska et al.
(Continued)

FOREIGN PATENT DOCUMENTS

WO    WO-2018067962 A1 *    4/2018    ........... G06N 3/0454

OTHER PUBLICATIONS

"Xception: Deep Learning with Depthwise Separable Convolutions"; Francois Chollet; 2017 IEEE Conference on Computer Vision and Pattern Recognition (Year: 2017).*

(Continued)

*Primary Examiner* — Michael S Osinski
(74) *Attorney, Agent, or Firm* — RC Patent Services

(57) ABSTRACT

Method and systems of replacing operations of depthwise separable filters with first and second replacement convolutional layers are disclosed. Depthwise separable filters contains a combination of a depthwise convolutional layer followed by a pointwise convolutional layer with input of P feature maps and output of Q feature maps. The first replacement convolutional layer contains P×P of 3×3 filter kernels formed by placing each of the P×1 of 3×3 filter kernels of the depthwise convolutional layer on respective P diagonal locations, and zero-value 3×3 filter kernels zero-value 3×3 filter kernels in all off-diagonal locations. The second replacement convolutional layer contains Q×P of 3×3 filter kernels formed by placing Q×P of 1×1 filter coefficients of the pointwise convolutional layer in center position of the respective Q×P of 3×3 filter kernels, and numerical value zero in eight perimeter positions.

5 Claims, 26 Drawing Sheets

Related U.S. Application Data which is a continuation-in-part of application No. 15/289,726, filed on Oct. 10, 2016, now Pat. No. 9,940,534.

(60) Provisional application No. 62/627,190, filed on Feb. 6, 2018.

(51) Int. Cl.
*G06N 3/04* (2006.01)
*G06K 9/66* (2006.01)
*G06N 3/063* (2006.01)
*G06K 9/00* (2006.01)

(52) U.S. Cl.
CPC ............ *G06K 9/66* (2013.01); *G06N 3/0454* (2013.01); *G06N 3/063* (2013.01)

(58) Field of Classification Search
CPC .... G06F 17/28; G06F 17/30705; G06F 17/21; G06F 17/2872; G06F 17/2881; G06F 17/30253; G06F 17/30256; G06F 17/30684; G06K 9/18; G06K 9/5158; G06K 9/55; G06K 9/00872; G06K 9/4676; G06K 9/4628; G06K 9/00986; G06K 9/6217; G06K 9/66; G06N 3/0481; G06N 3/08; G06N 3/063; G06N 3/0454; G06N 3/082

See application file for complete search history.

(56) References Cited

U.S. PATENT DOCUMENTS

| | | | |
|---|---|---|---|
| 6,047,276 | A | 4/2000 | Manganaro et al. |
| 6,519,363 | B1 | 2/2003 | Su et al. |
| 6,665,436 | B2 | 12/2003 | Su et al. |
| 6,754,645 | B2 | 6/2004 | Shi et al. |
| 6,941,513 | B2 | 9/2005 | Meystel et al. |
| 8,321,222 | B2 | 11/2012 | Pollet et al. |
| 8,726,148 | B1 | 5/2014 | Battilana |
| 9,026,432 | B2 | 5/2015 | Zangvil |
| 9,418,319 | B2 | 8/2016 | Shen et al. |
| 9,665,799 | B1 | 5/2017 | Munteanu et al. |
| 9,613,001 | B2 | 8/2017 | Herrero Abellanas et al. |
| 9,830,529 | B2* | 11/2017 | Jetley ................ G06K 9/4671 |
| 10,002,313 | B2* | 6/2018 | Vaca Castano ...... G06K 9/3233 |
| 10,185,891 | B1* | 1/2019 | Martin ................ G06K 9/6218 |
| 10,241,837 | B2* | 3/2019 | Huang ................ G06F 9/5044 |
| 2003/0108239 | A1 | 6/2003 | Su et al. |
| 2003/0110035 | A1 | 6/2003 | Thong et al. |
| 2007/0292047 | A1 | 12/2007 | Jiao et al. |
| 2008/0130996 | A1 | 6/2008 | Sternby |
| 2009/0048841 | A1 | 2/2009 | Pollet et al. |
| 2010/0158394 | A1 | 6/2010 | Chang et al. |
| 2010/0223219 | A1 | 9/2010 | Kato et al. |
| 2010/0286979 | A1 | 11/2010 | Zangvil et al. |
| 2011/0029471 | A1* | 2/2011 | Chakradhar .......... G06N 3/063 706/25 |
| 2011/0239032 | A1 | 9/2011 | Kato et al. |
| 2013/0002553 | A1 | 1/2013 | Colley |
| 2013/0060786 | A1 | 3/2013 | Serrano et al. |
| 2014/0040270 | A1 | 2/2014 | O'Sullivan et al. |
| 2014/0355835 | A1 | 12/2014 | Rodriguez-Serrano et al. |
| 2015/0178246 | A1 | 1/2015 | Herrero Abellanas et al. |
| 2015/0170021 | A1* | 6/2015 | Lupon .................. G06N 3/063 706/15 |
| 2015/0193431 | A1 | 7/2015 | Stoytchev et al. |
| 2016/0019459 | A1 | 1/2016 | Audhkhasi et al. |
| 2016/0062947 | A1 | 3/2016 | Chetlur et al. |
| 2016/0093343 | A1 | 3/2016 | Ovsiannikov et al. |
| 2016/0104056 | A1* | 4/2016 | He ...................... G06K 9/4609 382/158 |
| 2016/0358069 | A1 | 12/2016 | Brothers et al. |
| 2017/0004184 | A1 | 1/2017 | Jain et al. |
| 2017/0011279 | A1 | 1/2017 | Soldevila et al. |
| 2017/0032035 | A1 | 2/2017 | Gao et al. |
| 2017/0103298 | A1 | 4/2017 | Ling et al. |
| 2017/0103299 | A1 | 4/2017 | Aydonat et al. |
| 2017/0116495 | A1 | 4/2017 | Nomura et al. |
| 2017/0124409 | A1* | 5/2017 | Choi .................... G06N 3/0454 |
| 2017/0124415 | A1* | 5/2017 | Choi ........................ G06N 3/08 |
| 2017/0169315 | A1* | 6/2017 | Vaca Castano ...... G06K 9/3233 |
| 2017/0177710 | A1 | 6/2017 | Burlik |
| 2017/0200078 | A1 | 7/2017 | Bichler |
| 2017/0221176 | A1 | 8/2017 | Munteanu et al. |
| 2017/0262962 | A1 | 9/2017 | Rad et al. |
| 2017/0308770 | A1* | 10/2017 | Jetley ................... G06K 9/4671 |
| 2017/0323196 | A1 | 11/2017 | Gibson et al. |
| 2017/0357894 | A1* | 12/2017 | Bainville ............. G06N 3/0454 |
| 2018/0005074 | A1 | 1/2018 | Shacham et al. |
| 2018/0005344 | A1 | 1/2018 | Lim et al. |
| 2018/0060302 | A1 | 3/2018 | Liang et al. |
| 2018/0075581 | A1* | 3/2018 | Shi ........................ G06T 3/4053 |
| 2018/0089562 | A1* | 3/2018 | Jin ........................ G06F 7/5443 |
| 2018/0150956 | A1 | 3/2018 | Kao et al. |
| 2018/0114096 | A1* | 4/2018 | Sen ........................ G06T 5/002 |
| 2018/0129931 | A1* | 5/2018 | Bradbury ............... G06F 17/16 |
| 2018/0137388 | A1* | 5/2018 | Kim ...................... G06K 9/627 |
| 2018/0137406 | A1* | 5/2018 | Howard ................... G06N 3/04 |
| 2018/0137417 | A1* | 5/2018 | Theodorakopoulos ..................... G06N 3/0454 |
| 2018/0150457 | A9 | 5/2018 | Stoytchev et al. |
| 2018/0173571 | A1* | 6/2018 | Huang ................... G06F 9/5044 |
| 2018/0181838 | A1* | 6/2018 | Yang .................. G06K 9/00973 |
| 2018/0293711 | A1* | 10/2018 | Vogels ..................... G06K 9/40 |
| 2018/0315158 | A1* | 11/2018 | Nurvitadhi ................ G06T 1/20 |
| 2018/0341495 | A1* | 11/2018 | Culurciello ........... G06F 9/3895 |
| 2019/0080455 | A1* | 3/2019 | Chen ........................ G06T 7/10 |
| 2019/0080456 | A1* | 3/2019 | Song ...................... G06T 7/143 |
| 2019/0095706 | A1* | 3/2019 | Fujimoto ........... G06K 9/00335 |
| 2019/0095795 | A1* | 3/2019 | Ren ...................... G06N 3/082 |
| 2019/0108618 | A1* | 4/2019 | Hwang .................. G06T 3/4046 |
| 2019/0147318 | A1* | 5/2019 | Howard ................... G06N 3/04 |
| 2019/0156201 | A1* | 5/2019 | Bichler .................... G06N 3/08 |

OTHER PUBLICATIONS

USPTO Notice of Allowance U.S. Appl. No. 15/289,726 dated Jan. 30, 2018.

"Text feature extraction based on deep learning: a review", Hong Liang, Xiao Sun, Yunlei Sun and Yuan Gao; EURASIP Journal on Wireless Communications & Networking: Dec. 15, 2017, vol. Issue 1, pp. 1-12.

"Using convolution control block for Chinese sentiment analysis", Zheng Xiao, Xiong Li, Le Wang, Qiuwei Yang, Jiayi Du, Arun Kumar Sangaiah; Journal of Parallel & Distrubuted Computing, Jun. 2018, vol. 118, pp. 18-26.

"A survey of deep neural network architectures and their applications", Weibo Liu, Zidong Wang, Xiaohui Liu, Nianyin Zeng, Yuong Liu, Fuad E. Aisaadi; in Neurocomputing Apr. 19, 2017 234: pp. 11-26.

"Investigatation on deep learning for off-line handwritten Arabic character recognition"; Bonfenar et a.; in Cognitive Systems Research Aug. 2018 50: pp. 180-195.

"Chinese Character CAPTCHA Recognition and performance estimation via deep neural network", Lin et. al. ; Neurocomputing; May 2018, vol. 288, p. 11-19.

Building fast and compact convolutional neural networks for office handwritten Chinese character recognition, Xiao et al.; in Pattern Recognition Dec. 2017, pp. 72-81.

"Optical Character Recognition with Neural Network", Sarita; International Journal of Recent Research Aspects ISSN: 2349-7688, vol. 2 Issue 3, Sep. 2015, pp. 4-8.

"Improving handwritten Chinese text recognition using neural network language models and convolutional neural network shape models", Yi-Chao Wu; Fei Yin, Cheng-Lin Liu; in Pattern Recognition May 2017 65:pp. 251-264.

USPTO Notice of Allowance U.S. Appl. No. 15/709,220 dated Jul. 17, 2018.

(56) References Cited

OTHER PUBLICATIONS

USPTO Office Action U.S. Appl. No. 15/694,711 dated Aug. 3, 2018.
Shur et al. "A Corpus of Natural Language for Visual Reasoning", 2017, Facebook AI Research, Menlo Park, CA.
Yoon Kim, "Convolutional Neural Networks for Sentence Classification", Sep. 2014, New York University.
Rastegari et al. "XNOR-Net: ImageNet Classification Using Binary Convolutional Neural Networks", Aug. 2, 2016, Allen Institute for AI, Univ. of Washington.
Gysel et al. "Hardware-Oriented Approximation of Convolutional Neural Networks", Oct. 20, 2016, Department of Electrical and Computer Engineering, University of California, Davis, CA.
L. Chua et al. "Cellular Neural Networks: Theory", IEEE Transactions on Circuits and Systems, vol. 35, No. 10, pp. 1257-1271 Oct. 1988.
L. Chua et al. "Cellular Neural Networks: Applications", IEEE Transactions on Circuits and Systems, vol. 35, No. 10, pp. 1273-1290 Oct. 1988.
Angela Slavova "Applications of Some Mathematical Methods in the Analysis of Cellular Neural Networks", Journal of Computational and Applied Mathematics 114 (2000) 387-404.
Lee et al. "Color Image Processing in a Cellular Neural-Network Environment" IEEE Transaction on Neural Networks, vol. 7, No. 5. pp. 1086-1098 Sep. 1996.
L. Yang et al. "VLSI Implementation of Cellular Neural Networks", IEEE 1990 CH2868-8/90 pp. 2425-2427.
Korekado et al. "A VLSI Convolutional Neural Network for Image Recognition Using Merged/Mixed Analog-Digital Architecture", 2003.
Duan et al. "Memristor-Based Cellular Nonlinear/Neural Network: Design, Analysis, and Applications", IEEE Transactions on Neural Networks and Learning Systems 2014.
Simonyan et al. "Very Deep Convolutional Networks for Large-Scale Image Recognition", arXiv:1409.1556v6 [cs.CV] Apr. 10, 2015.
Howard et al. "MobileNets: Efficient Convolutional Neural Networks for Mobile Vision Applications", arXiv:1704.04861v1 [cs.CV] Apr. 17, 2017.

* cited by examiner

IMPLEMENTATION OF MOBILENET IN A CNN BASED DIGITAL INTEGRATED CIRCUIT

CROSS-REFERENCE TO RELATED APPLICATIONS

This application is a continuation-in-part (CIP) to a co-pending U.S. patent application Ser. No. 15/709,220 for "Natural Language Processing Using A CNN Based Integrated Circuit" filed on Sep. 19, 2017. This application is also a continuation-in-part (CIP) to a co-pending U.S. patent application Ser. No. 15/289,726 for "Digital Integrated Circuit For Extracting Features Out Of An Input Image Based On Cellular Neural Networks" filed on Oct. 10, 2016.

This application also claims priority to a U.S. Provisional Patent Application Ser. No. 62/627,190, entitled "Implementation Of MobileNet In A CNN Based Digital Integrated Circuit" filed on Feb. 6, 2018. All of which are hereby incorporated by reference in their entirety for all purposes.

FIELD

The invention generally relates to the field of machine learning and more particularly to implementation of Mobile-Net in a Cellular Neural Networks (CNN) based digital integrated circuit.

BACKGROUND

Cellular Neural Networks or Cellular Nonlinear Networks (CNN) have been applied to many different fields and problems including, but limited to, image processing since 1988. However, most of the prior art CNN approaches are either based on software solutions (e.g., Convolutional Neural Networks, Recurrent Neural Networks, etc.) or based on hardware that are designed for other purposes (e.g., graphic processing, general computation, etc.). As a result, CNN prior approaches are too slow in term of computational speed and/or too expensive thereby impractical for processing large amount of imagery data. The imagery data can be from any two-dimensional data (e.g., still photo, picture, a frame of a video stream, converted form of voice data, etc.).

In additional to convolutional layers, activation layers and pooling layers, MobileNet requires operations of depthwise separable filters. It would therefore be desirable to implement deep neural network using 3×3 convolutional filter kernels to replace such operations in a CNN based integrated circuit.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Methods and systems for implementation of MobileNet in a Cellular Neural Networks (CNN) based digital integrated circuit are disclosed. According to one aspect of the invention, a number of 3×3 filter kernels are used for replacing depthwise separable filters in deep learning network. Depthwise separable filters contain a combination of a depthwise convolutional layer followed by a pointwise convolutional layer. In one embodiment, replacement 3×3 filter kernels are implemented in a Cellular Neural Networks (CNN) based digital integrated circuit.

According to another aspect of the invention, a digital integrated circuit contains cellular neural networks (CNN) processing engines operatively coupled to at least one input/output data bus. The CNN processing engines are connected in a loop with a clock-skew circuit. Each CNN processing engine includes a CNN processing block and first and second sets of memory buffers. CNN processing block is configured for simultaneously obtaining convolution operations results using input data and pre-trained filter coefficients of a plurality of convolutional layers. The convolutional layers include first and second replacement convolutional layers configured for performing equivalent operations of depthwise separable filters. The first set of memory buffers operatively couples to the CNN processing block for storing the input data. The second set of memory buffers operative couples to the CNN processing block for storing the pre-trained filter coefficients.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTIONS

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or circuits representing one or more embodiments of the invention do not inherently indicate any particular order nor imply any limitations in the invention. Used herein, the terms "upper", "lower", "diagonal", "off-diagonal", "top", "bottom", "right" and "left" are intended to provide relative positions for the purposes of description, and are not intended to designate an absolute frame of reference Embodiments of the invention are discussed herein with reference to FIGS. 1A-1B-FIGS. 20A-20B. However, those skilled in the art will readily appreciate that the detailed description given herein with respect to these figures is for explanatory purposes as the invention extends beyond these limited embodiments.

Figure 1A:
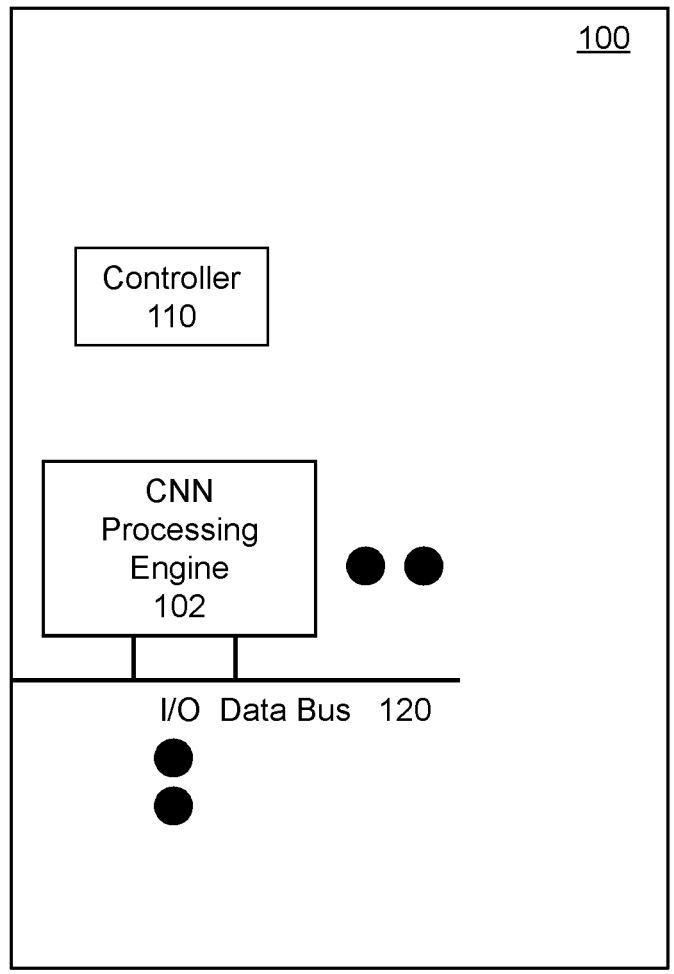
FIGS. 1A-1B are block diagrams illustrating an example integrated circuit designed for extracting features from input imagery data in accordance with one embodiment of the invention.

Referring first to FIG. 1A, it is shown a block diagram illustrating an example digital integrated circuit (IC) 100 for extracting features out of an input image in accordance with one embodiment of the invention.

The integrated circuit 100 is implemented as a digital semi-conductor chip and contains a CNN processing engine controller 110, and one or more neural networks (CNN) processing engines 102 operatively coupled to at least one input/output (I/O) data bus 120. Controller 110 is configured to control various operations of the CNN processing engines 102 for extracting features out of an input image based on an image processing technique by performing multiple layers of 3×3 convolutions with rectifications or other nonlinear operations (e.g., sigmoid function), and 2×2 pooling operations. To perform 3×3 convolutions requires imagery data in digital form and corresponding filter coefficients, which are supplied to the CNN processing engine 102 via input/output data bus 120. It is well known that digital semi-conductor chip contains logic gates, multiplexers, register files, memories, state machines, etc.

According to one embodiment, the digital integrated circuit 100 is extendable and scalable. For example, multiple copy of the digital integrated circuit 100 can be implemented on one semiconductor chip.

Figure 1B:
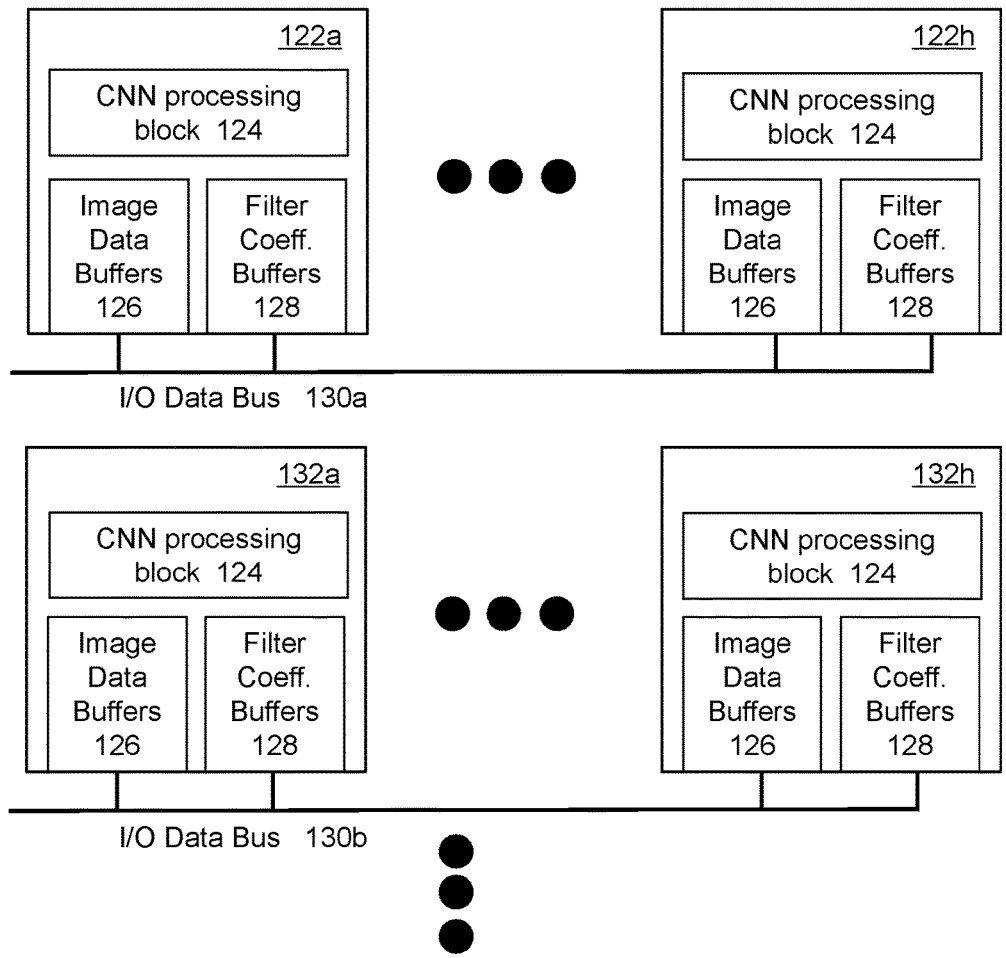

All of the CNN processing engines are identical. For illustration simplicity, only few (i.e., CNN processing engines 122a-122h, 132a-132h) are shown in FIG. 1B. The invention sets no limit to the number of CNN processing engines on a digital semi-conductor chip.

Each CNN processing engine 122a-122h, 132a-132h contains a CNN processing block 124, a first set of memory buffers 126 and a second set of memory buffers 128. The first set of memory buffers 126 is configured for receiving imagery data and for supplying the already received imagery data to the CNN processing block 124. The second set of memory buffers 128 is configured for storing filter coefficients and for supplying the already received filter coefficients to the CNN processing block 124. In general, the number of CNN processing engines on a chip is $2^n$, where n is an integer (i.e., 0, 1, 2, 3, . . . ). As shown in FIG. 1B, CNN processing engines 122a-122h are operatively coupled to a first input/output data bus 130a while CNN engines 132a-132h are operatively coupled to a second input/output data bus 130b. Each input/output data bus 130a-130b is configured for independently transmitting data (i.e., imagery data and filter coefficients). In one embodiment, the first and the second sets of memory buffers comprise random access memory (RAM). Each of the first and the second sets are logically defined. In other words, respective sizes of the first and the second sets can be reconfigured to accommodate respective amounts of imagery data and filter coefficients.

The first and the second I/O data bus 130a-130b are shown here to connect the CNN processing engines 122a-122h, 132a-132h in a sequential scheme. In another embodiment, the at least one I/O data bus may have different connection scheme to the CNN processing engines to accomplish the same purpose of parallel data input and output for improving performance.

Figure 2:
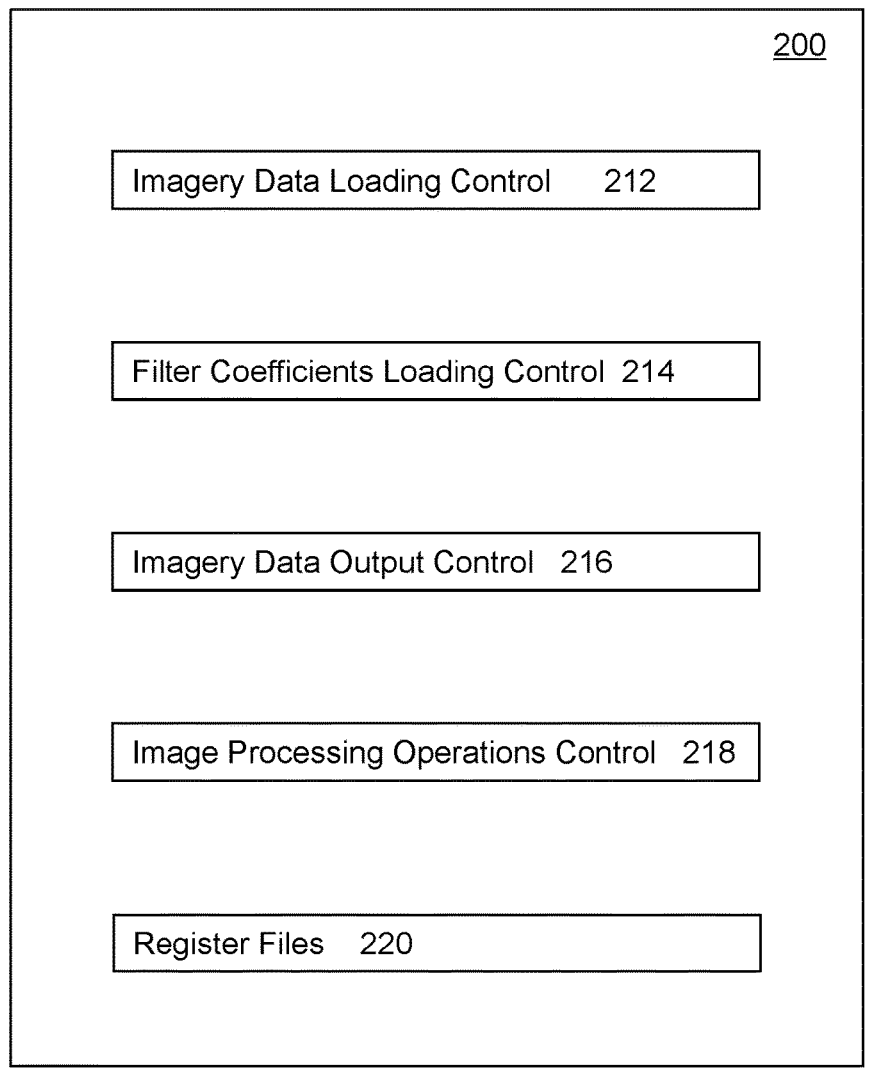
FIG. 2 is a function block diagram showing an example controller configured for controlling operations of one or more CNN processing engines according to an embodiment of the invention.

FIG. 2 is a diagram showing an example controller 200 for controlling various operations of at least one CNN processing engine configured on the integrated circuit. Controller 200 comprises circuitry to control imagery data loading control 212, filter coefficients loading control 214, imagery data output control 216, and image processing operations control 218. Controller 200 further includes register files 220 for storing the specific configuration (e.g., number of CNN processing engines, number of input/output data bus, etc.) in the integrated circuit.

Image data loading control 212 controls loading of imagery data to respective CNN processing engines via the corresponding I/O data bus. Filter coefficients loading control 214 controls loading of filter coefficients to respective CNN processing engines via corresponding I/O data bus. Imagery data output control 216 controls output of the imagery data from respective CNN processing engines via corresponding I/O data bus. Image processing operations control 218 controls various operations such as convolutions, rectifications and pooling operations which can be defined by user of the integrated circuit via a set of user defined directives (e.g., file contains a series of operations such as convolution, rectification, pooling, etc.).

Figure 3:
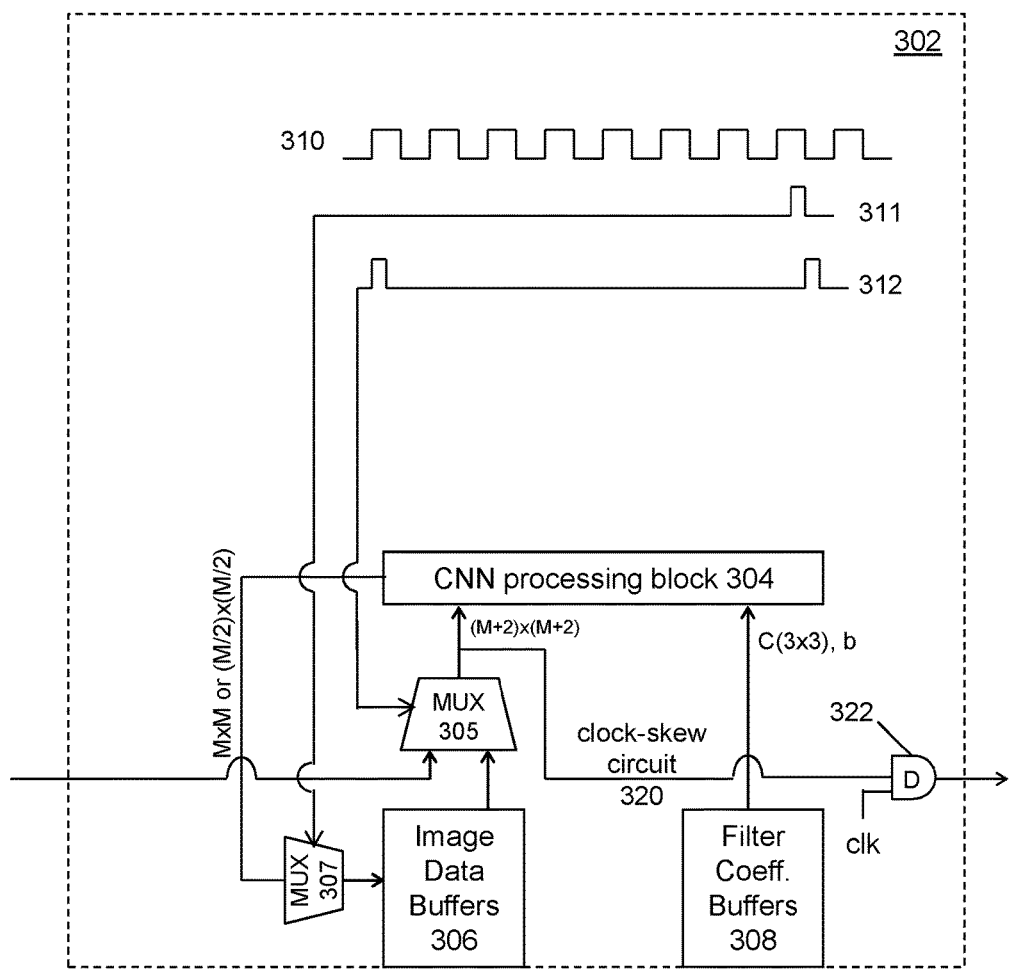
FIG. 3 is a diagram showing an example CNN processing engine in accordance with one embodiment of the invention.

More details of a CNN processing engine 302 are shown in FIG. 3. A CNN processing block 304 contains digital circuitry that simultaneously obtains M×M convolution operations results by performing 3×3 convolutions at M×M pixel locations using imagery data of a (M+2)-pixel by (M+2)-pixel region and corresponding filter coefficients from the respective memory buffers. The (M+2)-pixel by (M+2)-pixel region is formed with the M×M pixel locations as an M-pixel by M-pixel central portion plus a one-pixel border surrounding the central portion. M is a positive integer. In one embodiment, M equals to 14 and therefore, (M+2) equals to 16, M×M equals to 14×14=196, and M/2 equals 7.

Figure 4:
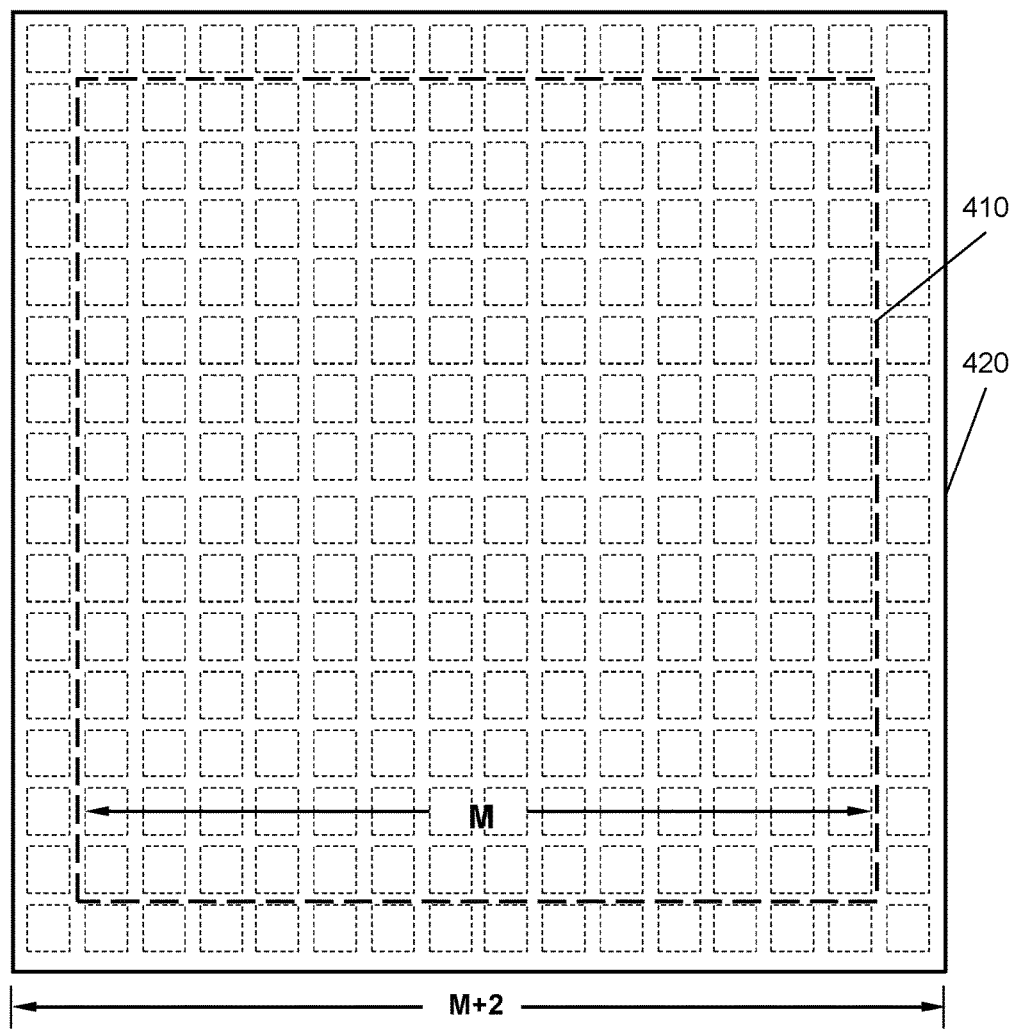
FIG. 4 is a diagram showing M×M pixel locations within a (M+2)-pixel by (M+2)-pixel region, according to an embodiment of the invention.

FIG. 4 is a diagram showing a diagram representing (M+2)-pixel by (M+2)-pixel region 410 with a central portion of M×M pixel locations 420 used in the CNN processing engine 302.

Imagery data may represent characteristics of a pixel in the input image (e.g., one of the color (e.g., RGB (red, green, blue)) values of the pixel, or distance between pixel and observing location). Generally, the value of the RGB is an integer between 0 and 255. Values of filter coefficients are floating point integer numbers that can be either positive or negative.

In order to achieve faster computations, few computational performance improvement techniques have been used and implemented in the CNN processing block 304. In one embodiment, representation of imagery data uses as few bits as practical (e.g., 5-bit representation). In another embodiment, each filter coefficient is represented as an integer with a radix point. Similarly, the integer representing the filter coefficient uses as few bits as practical (e.g., 12-bit representation). As a result, 3×3 convolutions can then be performed using fixed-point arithmetic for faster computations.

Each 3×3 convolution produces one convolution operations result, Out(m, n), based on the following formula:

$$\mathrm{Out}(m, n) = \sum_{1 \le i, j \le 3} \mathrm{In}(m, n, i, j) \times C(i, j) - b \quad (1)$$

where:
m, n are corresponding row and column numbers for identifying which imagery data (pixel) within the (M+2)-pixel by (M+2)-pixel region the convolution is performed;
In(m,n,i,j) is a 3-pixel by 3-pixel area centered at pixel location (m, n) within the region;

C(i, j) represents one of the nine weight coefficients C(3×3), each corresponds to one of the 3-pixel by 3-pixel area;
b represents an offset coefficient; and
i, j are indices of weight coefficients C(i, j).

Each CNN processing block 304 produces M×M convolution operations results simultaneously and, all CNN processing engines perform simultaneous operations.

Figure 5A:
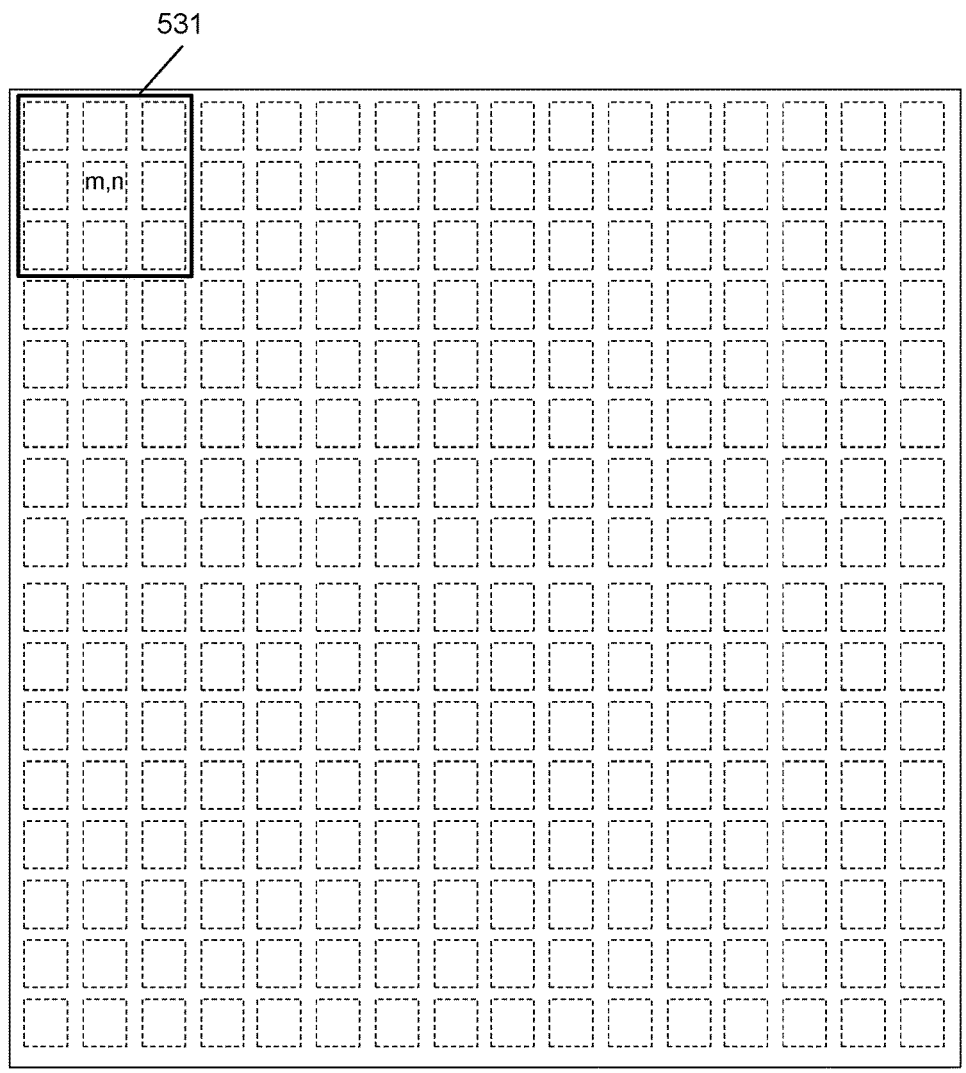
FIGS. 5A-5C are diagrams showing three example pixel locations, according to an embodiment of the invention.
Figure 5B:
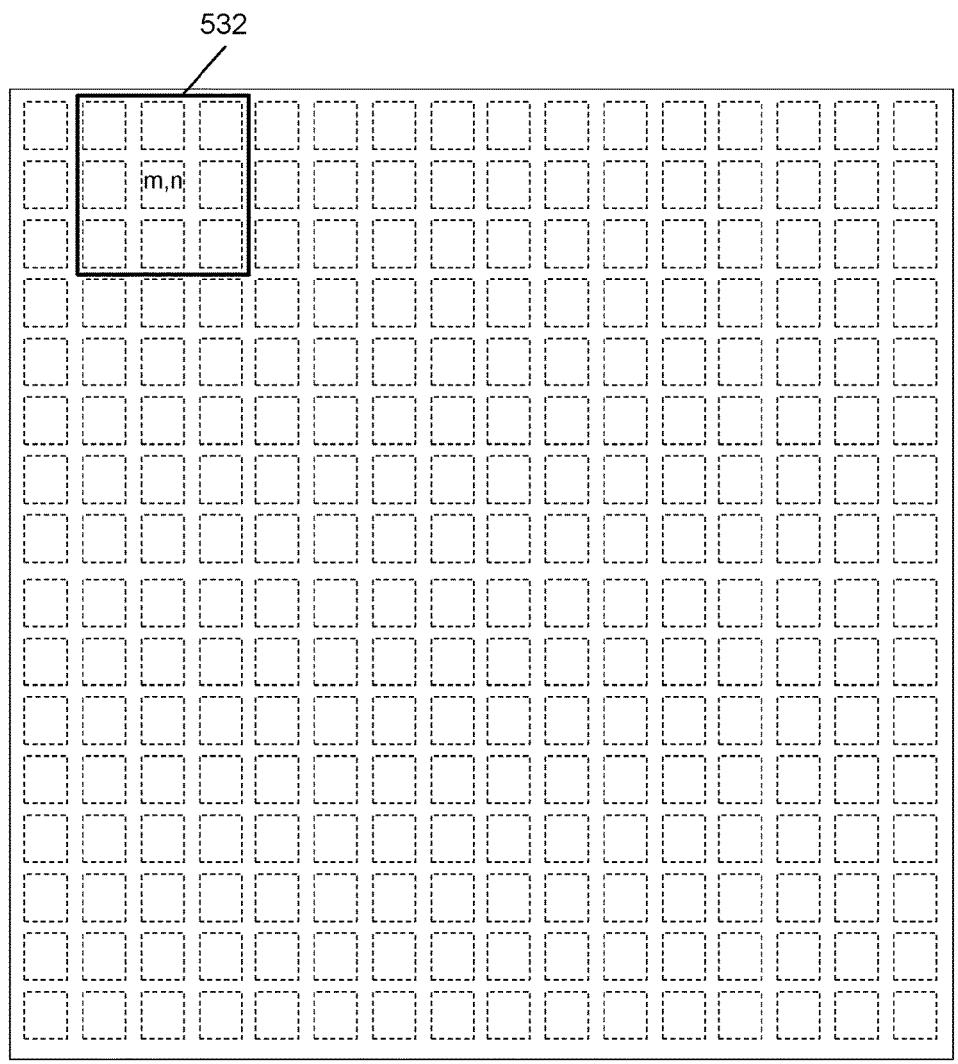
Figure 5C:
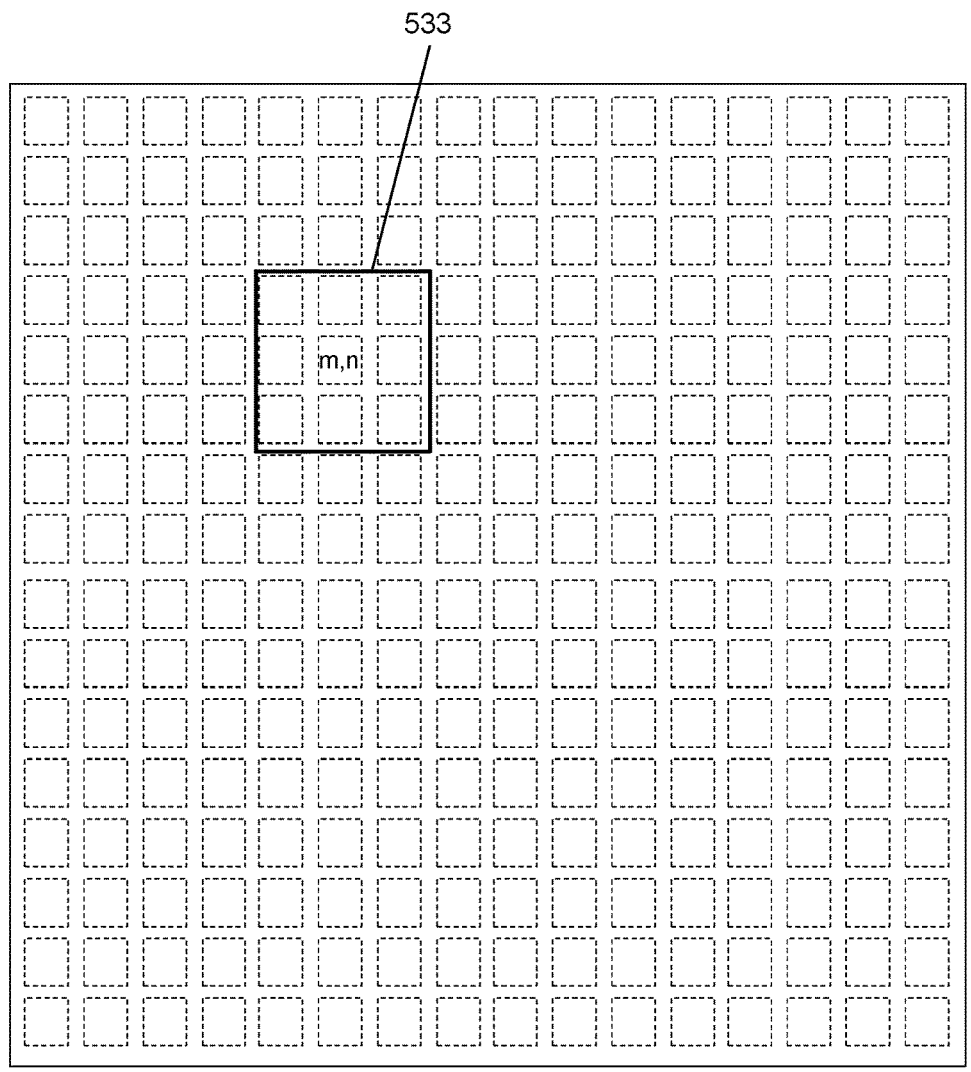

FIGS. 5A-5C show three different examples of the M×M pixel locations. The first pixel location 531 shown in FIG. 5A is in the center of a 3-pixel by 3-pixel area within the (M+2)-pixel by (M+2)-pixel region at the upper left corner. The second pixel location 532 shown in FIG. 5B is one pixel data shift to the right of the first pixel location 531. The third pixel location 533 shown in FIG. 5C is a typical example pixel location. M×M pixel locations contain multiple overlapping 3-pixel by 3-pixel areas within the (M+2)-pixel by (M+2)-pixel region.

Figure 6:
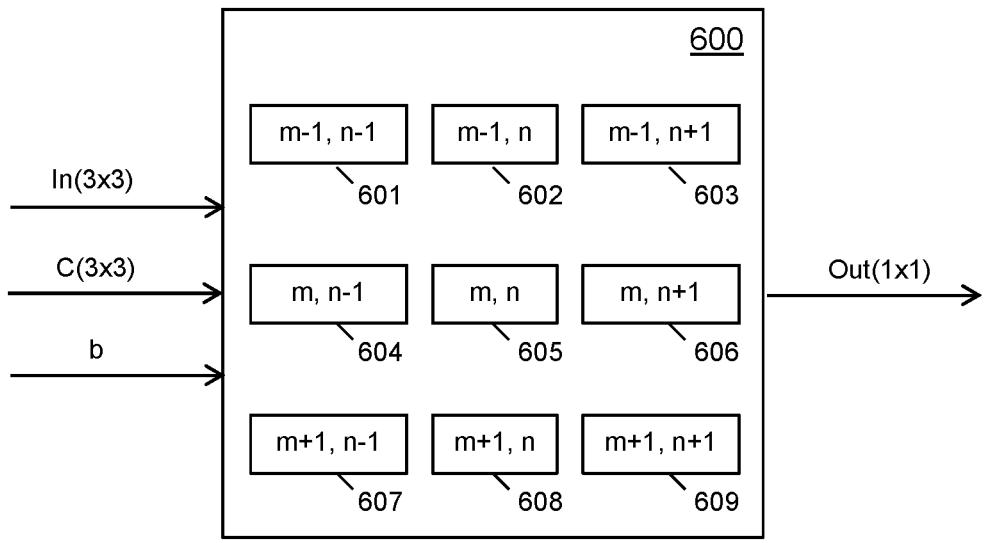
FIG. 6 is a diagram illustrating an example data arrangement for performing 3×3 convolutions at a pixel location, according to one embodiment of the invention.

To perform 3×3 convolutions at each sampling location, an example data arrangement is shown in FIG. 6. Imagery data (i.e., In(3×3)) and filter coefficients (i.e., weight coefficients C(3×3) and an offset coefficient b) are fed into an example CNN 3×3 circuitry 600. After 3×3 convolutions operation in accordance with Formula (1), one output result (i.e., Out(1×1)) is produced. At each sampling location, the imagery data In(3×3) is centered at pixel coordinates (m, n) 605 with eight immediate neighbor pixels 601-604, 606-609.

Figure 7:
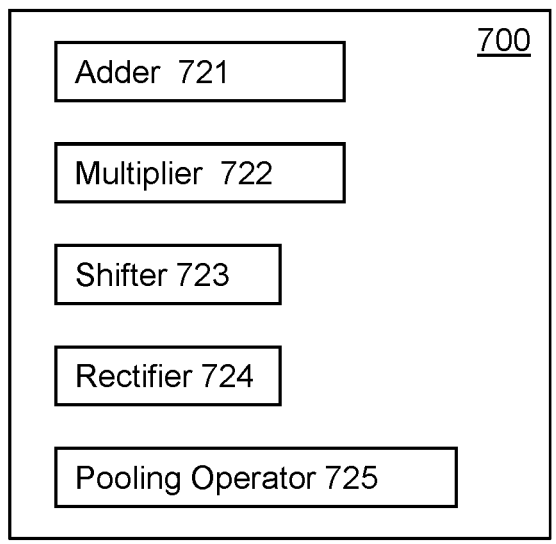
FIG. 7 is a function block diagram illustrating an example circuitry for performing 3×3 convolutions at a pixel location, according to one embodiment of the invention.

FIG. 7 is a function diagram showing an example CNN 3×3 circuitry 700 for performing 3×3 convolutions at each pixel location. The circuitry 700 contains at least adder 721, multiplier 722, shifter 723, rectifier 724 and pooling operator 725. In a digital semi-conductor implementation, all of these can be achieved with logic gates and multiplexers, which are generated using well-known methods (e.g., hardware description language such as Verilog, etc.). Adder 721 and multiplier 722 are used for addition and multiplication operations. Shifter 723 is for shifting the output result in accordance with fixed-point arithmetic involved in the 3×3 convolutions. Rectifier 724 is for setting negative output results to zero. Pooling operator 725 is for performing 2×2 pooling operations.

Imagery data are stored in a first set of memory buffers 306, while filter coefficients are stored in a second set of memory buffers 308. Both imagery data and filter coefficients are fed to the CNN block 304 at each clock of the digital integrated circuit. Filter coefficients (i.e., C(3×3) and b) are fed into the CNN processing block 304 directly from the second set of memory buffers 308. However, imagery data are fed into the CNN processing block 304 via a multiplexer MUX 305 from the first set of memory buffers 306. Multiplexer 305 selects imagery data from the first set of memory buffers based on a clock signal (e.g., pulse 312).

Otherwise, multiplexer MUX 305 selects imagery data from a first neighbor CNN processing engine (from the left side of FIG. 3 not shown) through a clock-skew circuit 320.

At the same time, a copy of the imagery data fed into the CNN processing block 304 is sent to a second neighbor CNN processing engine (to the right side of FIG. 3 not shown) via the clock-skew circuit 320. Clock-skew circuit 320 can be achieved with known techniques (e.g., a D flip-flop 322).

The first neighbor CNN processing engine may be referred to as an upstream neighbor CNN processing engine in the loop formed by the clock-skew circuit 320. The second neighbor CNN processing engine may be referred to as a downstream CNN processing engine. In another embodiment, when the data flow direction of the clock-skew circuit is reversed, the first and the second CNN processing engines are also reversed becoming downstream and upstream neighbors, respectively.

After 3×3 convolutions for each group of imagery data are performed for predefined number of filter coefficients, convolution operations results Out(m, n) are sent to the first set of memory buffers via another multiplex MUX 307 based on another clock signal (e.g., pulse 311). An example clock cycle 310 is drawn for demonstrating the time relationship between pulse 311 and pulse 312. As shown pulse 311 is one clock before pulse 312, as a result, the 3×3 convolution operations results are stored into the first set of memory buffers after a particular block of imagery data has been processed by all CNN processing engines through the clock-skew circuit 320.

Figure 8:
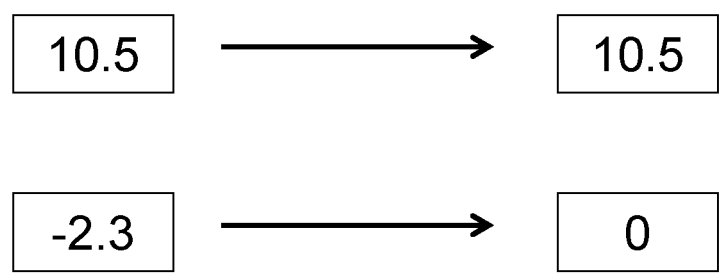
FIG. 8 is a diagram showing an example rectification according to an embodiment of the invention.

After the convolution operations result Out(m, n) is obtained from Formula (1), rectification procedure may be performed as directed by image processing control 218. Any convolution operations result, Out(m, n), less than zero (i.e., negative value) is set to zero. In other words, only positive value of output results are kept. FIG. 8 shows two example outcomes of rectification. A positive output value 10.5 retains as 10.5 while −2.3 becomes 0. Rectification causes non-linearity in the integrated circuits.

If a 2×2 pooling operation is required, the M×M output results are reduced to (M/2)×(M/2). In order to store the (M/2)×(M/2) output results in corresponding locations in the first set of memory buffers, additional bookkeeping techniques are required to track proper memory addresses such that four (M/2)×(M/2) output results can be processed in one CNN processing engine.

Figure 9A:
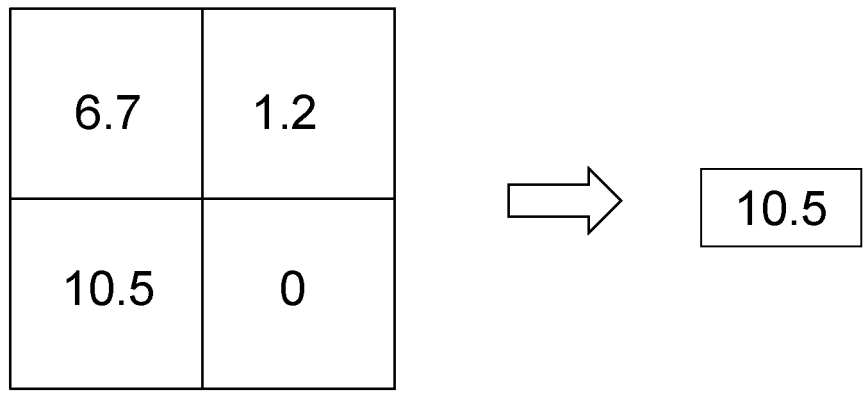
FIGS. 9A-9B are diagrams showing two example 2×2 pooling operations according to an embodiment of the invention.
Figure 9B:
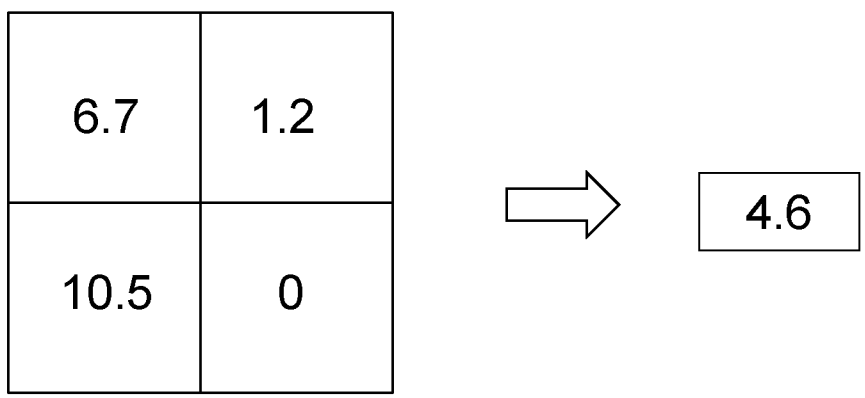
Figure 10:
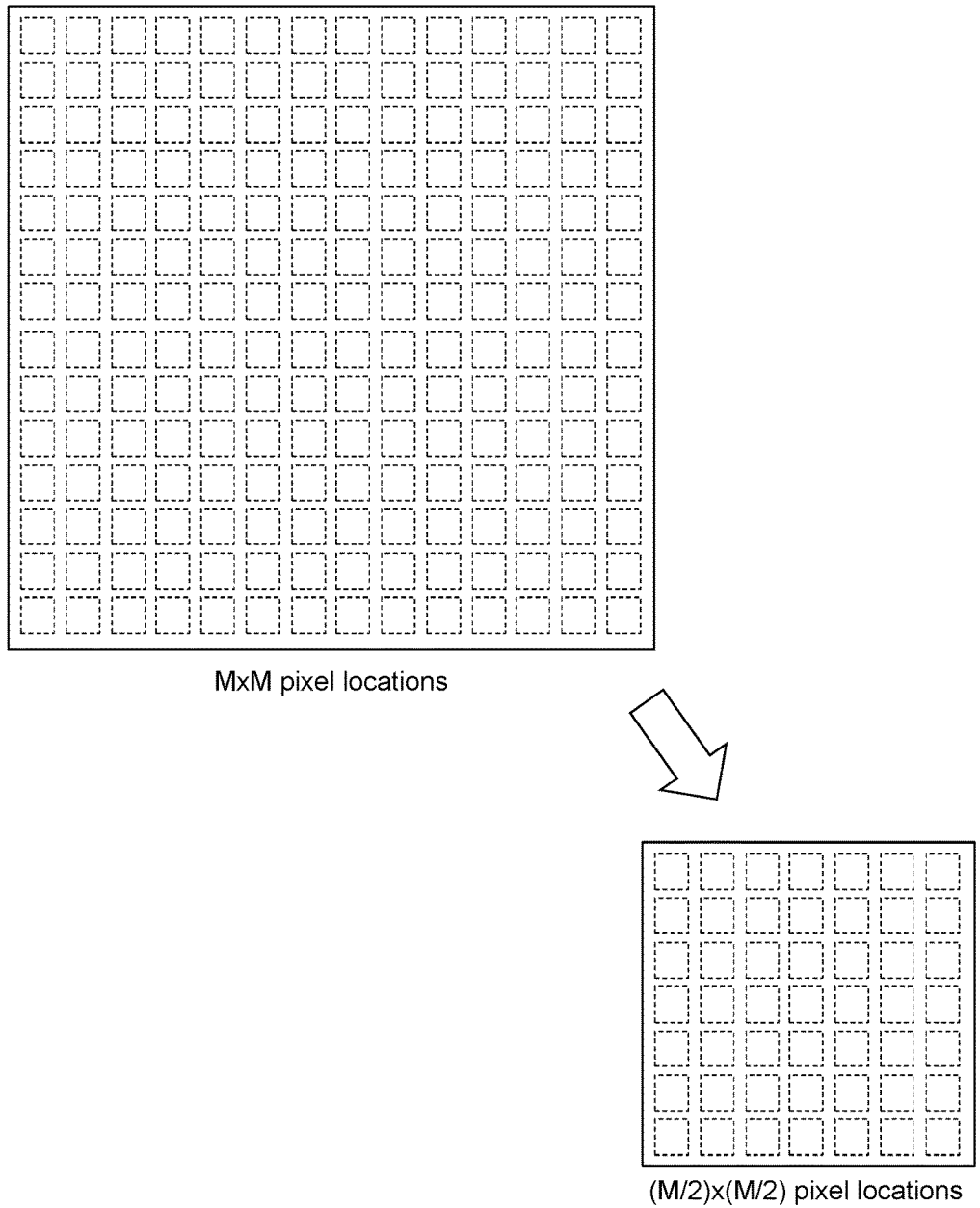
FIG. 10 is a diagram illustrating a 2×2 pooling operation reduces M-pixel by M-pixel block to a (M/2)-pixel by (M/2)-pixel block in accordance with one embodiment of the invention.

To demonstrate a 2×2 pooling operation, FIG. 9A is a diagram graphically showing first example output results of a 2-pixel by 2-pixel block being reduced to a single value 10.5, which is the largest value of the four output results. The technique shown in FIG. 9A is referred to as "max pooling". When the average value 4.6 of the four output results is used for the single value shown in FIG. 9B, it is referred to as "average pooling". There are other pooling operations, for example, "mixed max average pooling" which is a combination of "max pooling" and "average pooling". The main goal of the pooling operation is to reduce the size of the imagery data being processed. FIG. 10 is a diagram illustrating M×M pixel locations, through a 2×2 pooling operation, being reduced to (M/2)×(M/2) locations, which is one fourth of the original size.

Figure 11A:
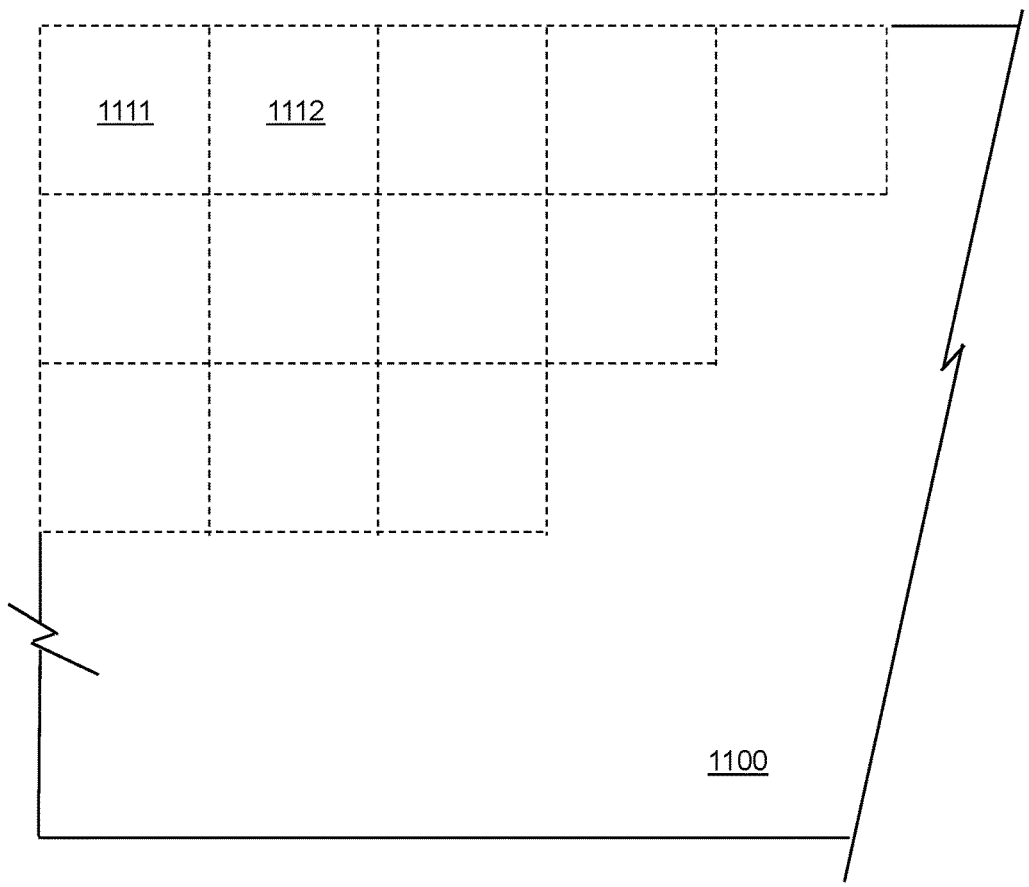
FIGS. 11A-11C are diagrams illustrating examples of M-pixel by M-pixel blocks and corresponding (M+2)-pixel by (M+2)-pixel region in an input image, according to one embodiment of the invention.

An input image generally contains a large amount of imagery data. In order to perform image processing operations. The input image 1100 is partitioned into M-pixel by M-pixel blocks 1111-1112 as shown in FIG. 11A. Imagery data associated with each of these M-pixel by M-pixel blocks is then fed into respective CNN processing engines. At each of the M×M pixel locations in a particular M-pixel by M-pixel block, 3×3 convolutions are simultaneously performed in the corresponding CNN processing block.

Although the invention does not require specific characteristic dimension of an input image, the input image may be required to resize to fit into a predefined characteristic dimension for certain image processing procedures. In an embodiment, a square shape with ($2^K$×M)-pixel by ($2^K$×M)-pixel is required. K is a positive integer (e.g., 1, 2, 3, 4, etc.). When M equals 14 and K equals 4, the characteristic dimension is 224. In another embodiment, the input image is a rectangular shape with dimensions of ($2^I$×M)-pixel and ($2^J$×M)-pixel, where I and J are positive integers.

Figure 11B:
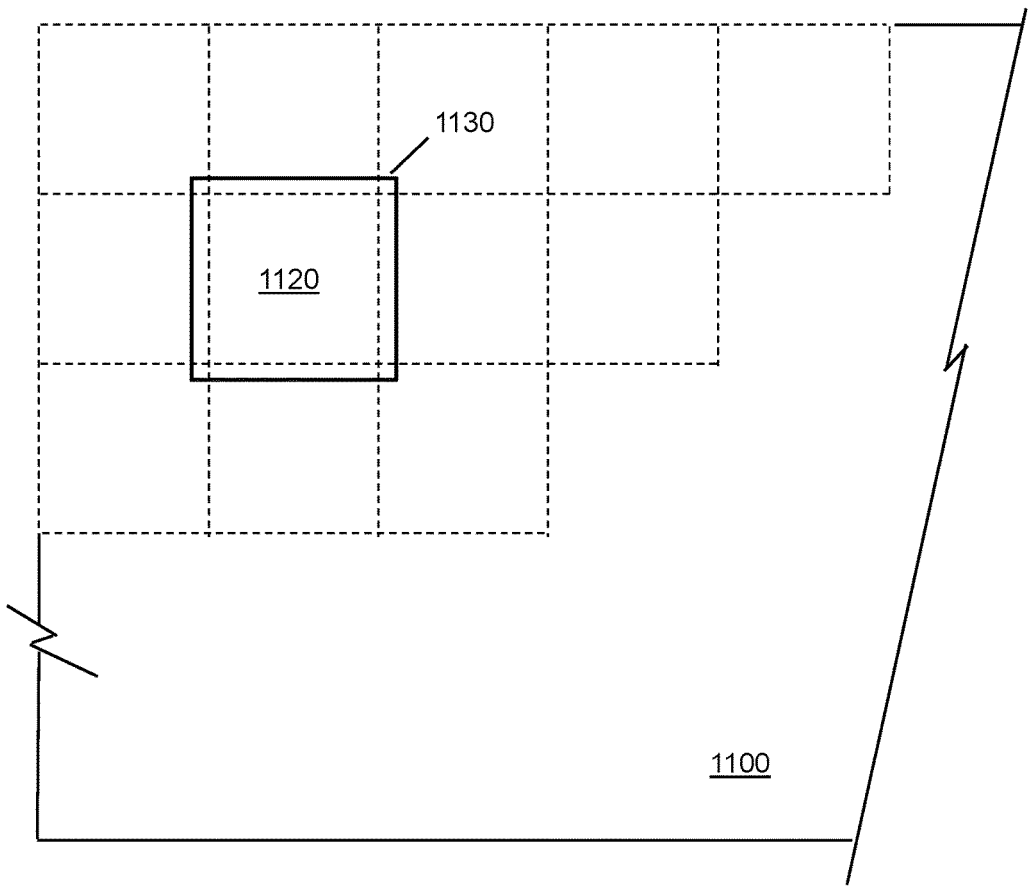
Figure 12:
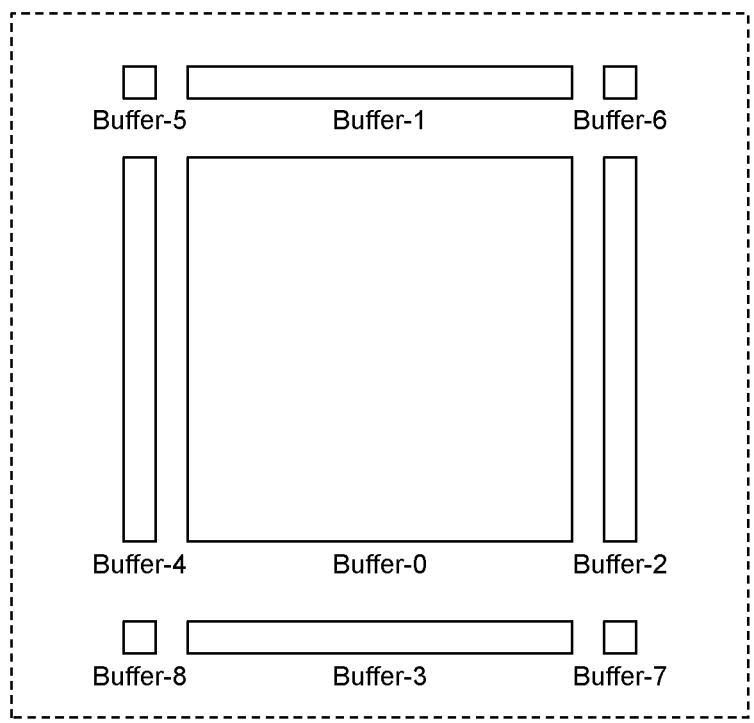
FIG. 12 is a diagram illustrating an example of a first set of memory buffers for storing received imagery data in accordance with an embodiment of the invention.

In order to properly perform 3×3 convolutions at pixel locations around the border of a M-pixel by M-pixel block, additional imagery data from neighboring blocks are required. FIG. 11B shows a typical M-pixel by M-pixel block 1120 (bordered with dotted lines) within a (M+2)-pixel by (M+2)-pixel region 1130. The (M+2)-pixel by (M+2)-pixel region is formed by a central portion of M-pixel by M-pixel from the current block, and four edges (i.e., top, right, bottom and left) and four corners (i.e., top-left, top-right, bottom-right and bottom-left) from corresponding neighboring blocks. Additional details are shown in FIG. 12 and corresponding descriptions for the first set of memory buffers.

Figure 11C:
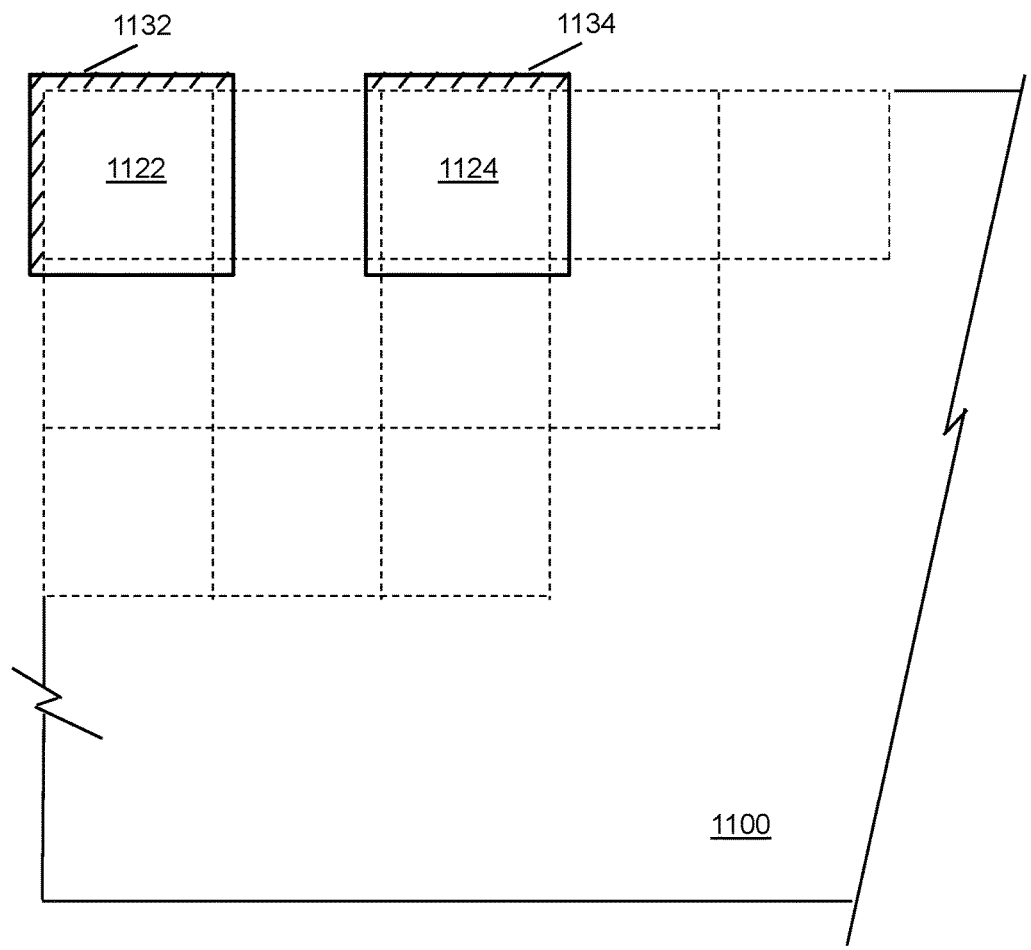

FIG. 11C shows two example M-pixel by M-pixel blocks 1122-1124 and respective associated (M+2)-pixel by (M+2)-pixel regions 1132-1134. These two example blocks 1122-1124 are located along the perimeter of the input image. The first example M-pixel by M-pixel block 1122 is located at top-left corner, therefore, the first example block 1122 has neighbors for two edges and one corner. Value "0"s are used for the two edges and three corners without neighbors (shown as shaded area) in the associated (M+2)-pixel by (M+2)-pixel region 1132 for forming imagery data. Similarly, the associated (M+2)-pixel by (M+2)-pixel region 1134 of the second example block 1124 requires "0"s be used for the top edge and two top corners. Other blocks along the perimeter of the input image are treated similarly. In other words, for the purpose to perform 3×3 convolutions at each pixel of the input image, a layer of zeros ("0" s) is added outside of the perimeter of the input image. This can be achieved with many well-known techniques. For example, default values of the first set of memory buffers are set to zero. If no imagery data is filled in from the neighboring blocks, those edges and corners would contain zeros.

Furthermore, an input image can contain a large amount of imagery data, which may not be able to be fed into the CNN processing engines in its entirety. Therefore, the first set of memory buffers is configured on the respective CNN processing engines for storing a portion of the imagery data of the input image. The first set of memory buffers contains nine different data buffers graphically illustrated in FIG. 12. Nine buffers are designed to match the (M+2)-pixel by (M+2)-pixel region as follows:

1) buffer-0 for storing M×M pixels of imagery data representing the central portion;
2) buffer-1 for storing 1×M pixels of imagery data representing the top edge;
3) buffer-2 for storing M×1 pixels of imagery data representing the right edge;
4) buffer-3 for storing 1×M pixels of imagery data representing the bottom edge;
5) buffer-4 for storing M×1 pixels of imagery data representing the left edge;
6) buffer-5 for storing 1×1 pixels of imagery data representing the top left corner;
7) buffer-6 for storing 1×1 pixels of imagery data representing the top right corner;
8) buffer-7 for storing 1×1 pixels of imagery data representing the bottom right corner; and
9) buffer-8 for storing 1×1 pixels of imagery data representing the bottom left corner.

Imagery data received from the I/O data bus are in form of M×M pixels of imagery data in consecutive blocks. Each M×M pixels of imagery data is stored into buffer-0 of the current block. The left column of the received M×M pixels of imagery data is stored into buffer-2 of previous block, while the right column of the received M×M pixels of imagery data is stored into buffer-4 of next block. The top and the bottom rows and four corners of the received M×M pixels of imagery data are stored into respective buffers of corresponding blocks based on the geometry of the input image (e.g., FIGS. 11A-11C).

Figure 13A:
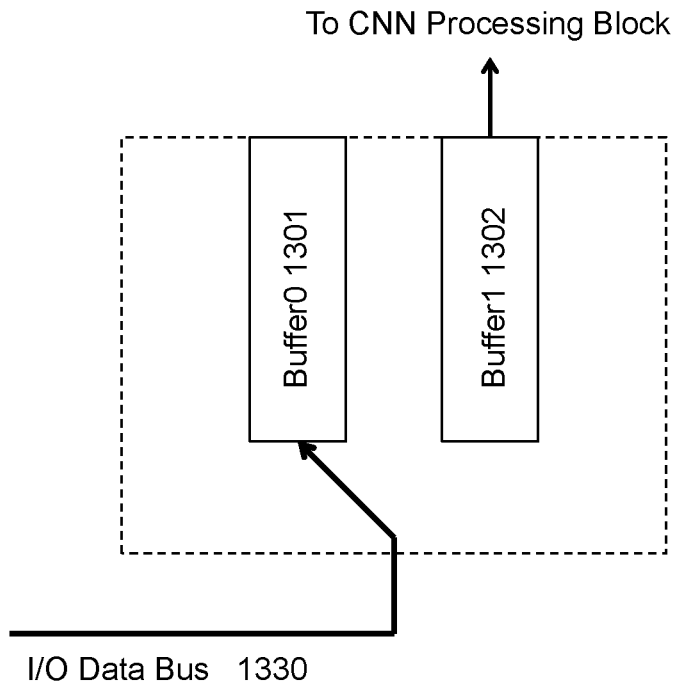
FIG. 13A is a diagram showing two operational modes of an example second set of memory buffers for storing filter coefficients in accordance with an embodiment of the invention.
Figure 13A:
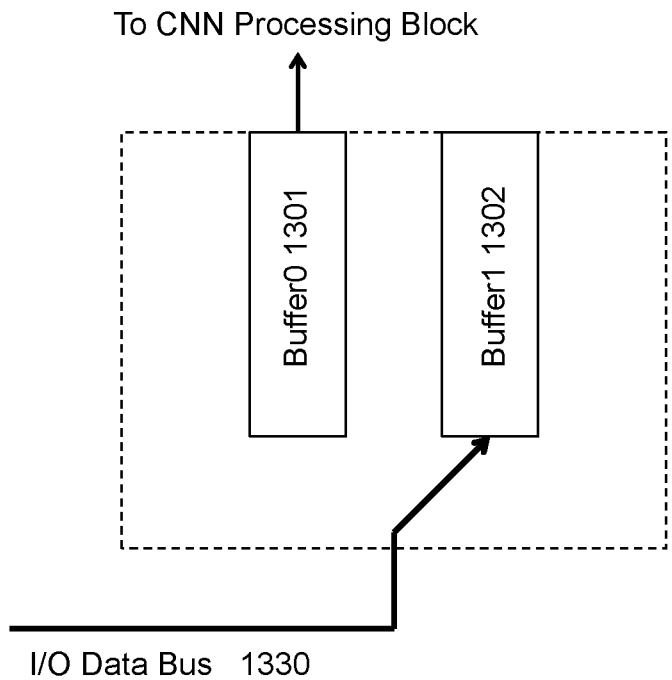

An example second set of memory buffers for storing filter coefficients are shown in FIG. 13A. In one embodiment, a pair of independent buffers Buffer0 1301 and Buffer1 1302 is provided. The pair of independent buffers allow one of the buffers 1301-1302 to receive data from the I/O data bus 1330 while the other one to feed data into a CNN processing block (not shown). Two operational modes are shown herein.

Figure 13B:
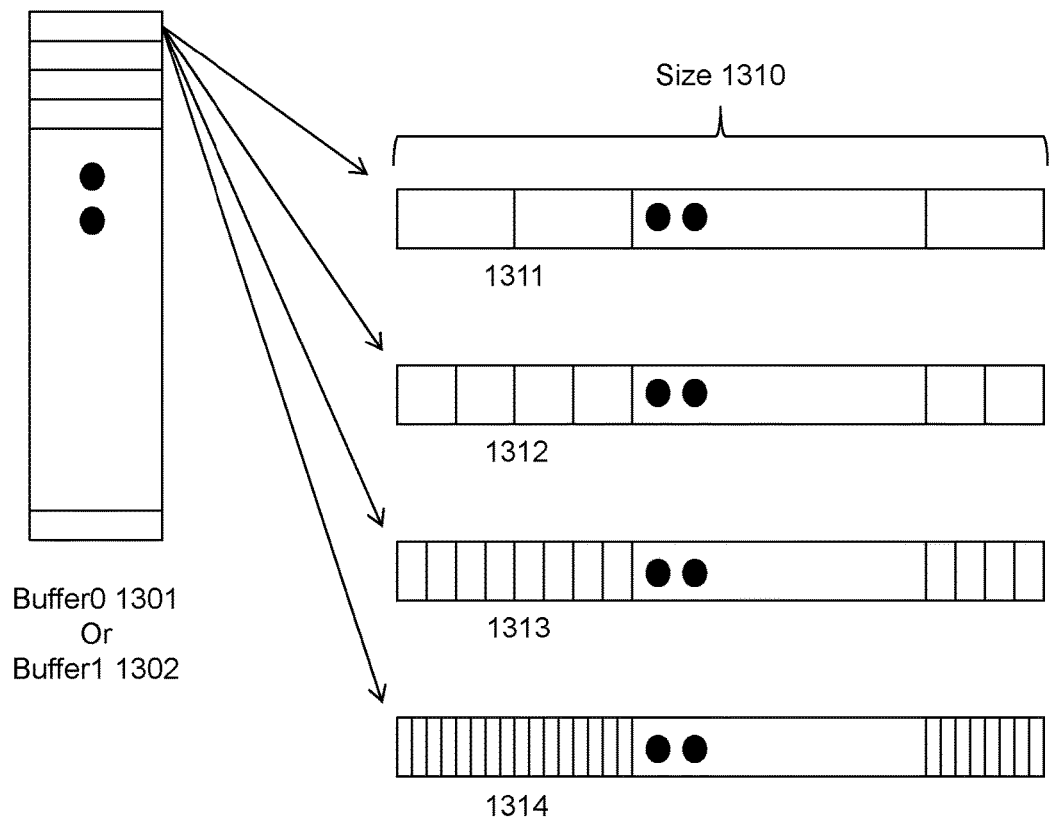
FIG. 13B is a diagram showing example storage schemes of filter coefficients in the second set of memory buffers, according to an embodiment of the invention.

Example storage schemes of filter coefficients are shown in FIG. 13B. Each of the pair of buffers (i.e., Buffer0 1301 or Buffer1 1302) has a width (i.e., word size 1310). In one embodiment, the word size is 120-bit. Accordingly, each of the filter coefficients (i.e., C(3×3) and b) occupies 12-bit in the first example storage scheme 1311. In the second example storage scheme 1312, each filter coefficient occupies 6-bit thereby 20 coefficients are stored in each word. In the third example scheme 1313, 3-bit is used for each coefficient hence four sets of filter coefficients (40 coefficients) are stored. Finally, in the fourth example storage scheme 1314, 80 coefficients are stored in each word, each coefficient occupies 1.5-bit.

In another embodiment, a third memory buffer can be set up for storing entire filter coefficients to avoid I/O delay. In general, the input image must be at certain size such that all filter coefficients can be stored. This can be done by allocating some unused capacity in the first set of memory buffers to accommodate such a third memory buffer. Since all memory buffers are logically defined in RAM (Random-Access Memory), well known techniques may be used for creating the third memory buffer. In other words, the first and the second sets of memory buffers can be adjusted to fit different amounts of imagery data and/or filter coefficients. Furthermore, the total amount of RAM is dependent upon what is required in image processing operations.

Figure 14:
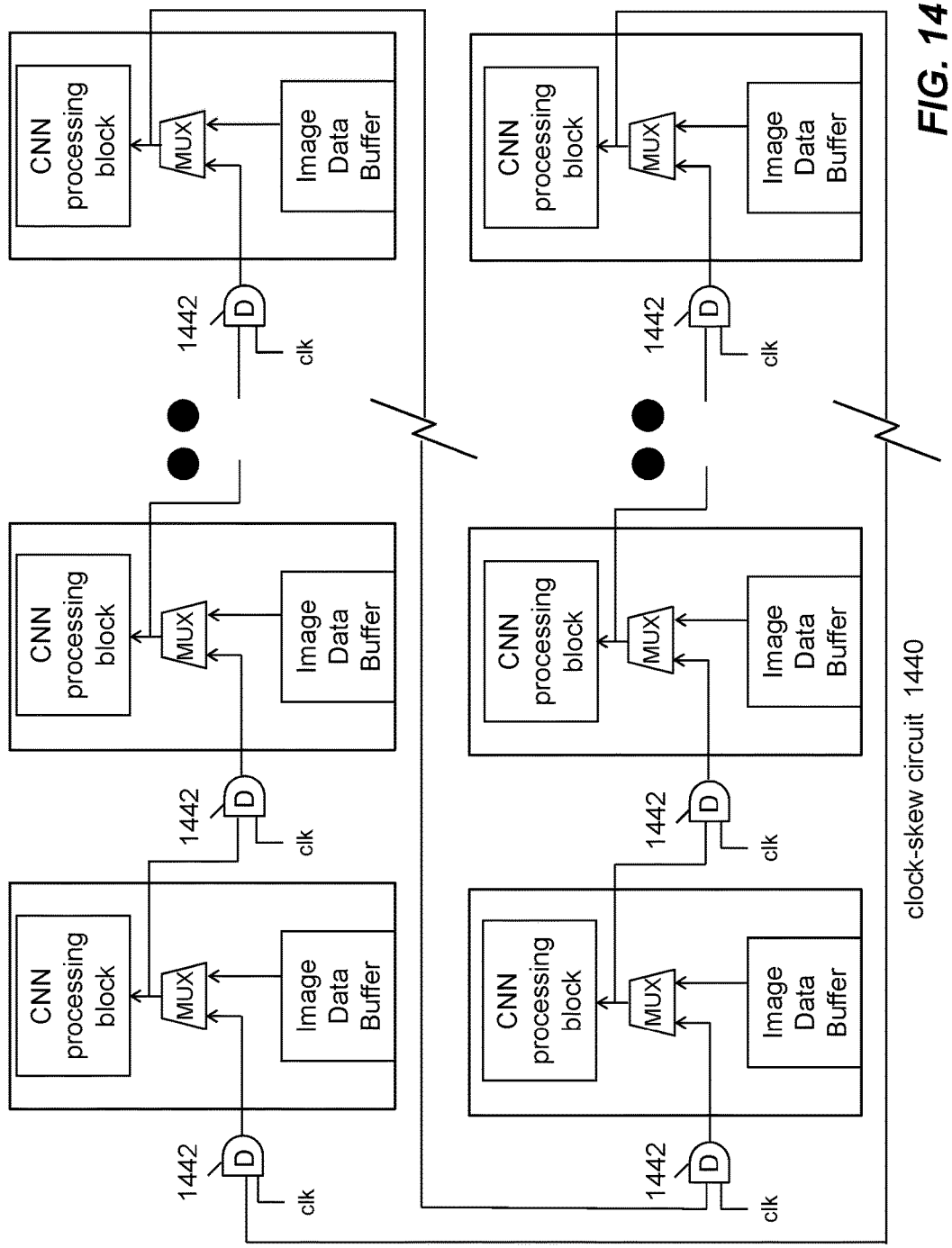
FIG. 14 is a diagram showing a plurality of CNN processing engines connected as a loop via an example clock-skew circuit in accordance of an embodiment of the invention.

When more than one CNN processing engine is configured on the integrated circuit. The CNN processing engine is connected to first and second neighbor CNN processing engines via a clock-skew circuit. For illustration simplicity, only CNN processing block and memory buffers for imagery data are shown. An example clockskew circuit 1440 for a group of CNN processing engines are shown in FIG. 14. The CNN processing engines connected via the second example clock-skew circuit 1440 to form a loop. In other words, each CNN processing engine sends its own imagery data to a first neighbor and, at the same time, receives a second neighbor's imagery data. Clockskew circuit 1440 can be achieved with well-known manners. For example, each CNN processing engine is connected with a D flip-flop 1442.

A special case with only two CNN processing engines are connected in a loop, the first neighbor and the second neighbor are the same.

Figure 15:
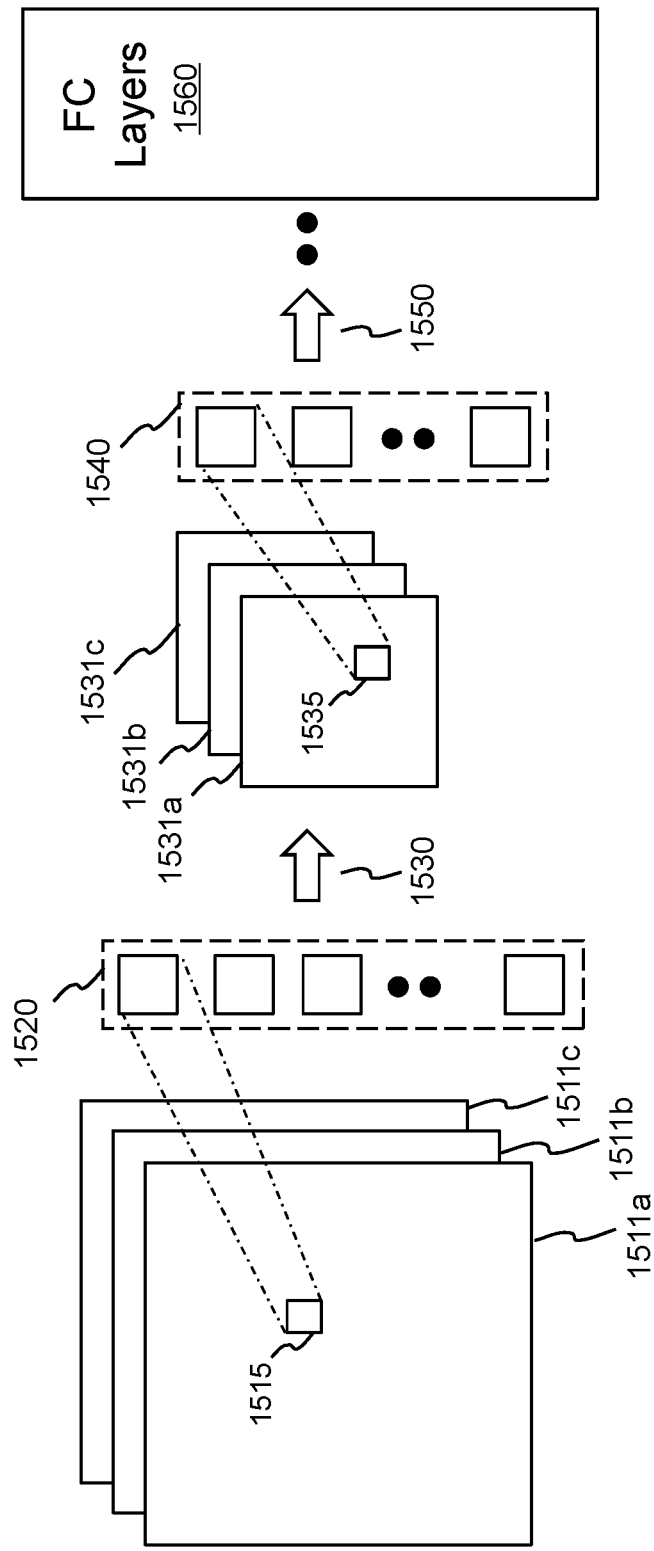
FIG. 15 is a schematic diagram showing an example image processing technique based on convolutional neural networks in accordance with an embodiment of the invention.

Referring now to FIG. 15, it is a schematic diagram showing an example image processing technique based on convolutional neural networks in accordance with an embodiment of the invention. Based on convolutional neural networks, multi-layer input imagery data 1511a-1511c is processed with convolutions using a first set of filters or weights 1520. Since the imagery data 1511a-1511c is larger than the filters 1520. Each corresponding overlapped sub-region 1515 of the imagery data is processed. After the convolutional results are obtained, activation may be conducted before a first pooling operation 1530. In one embodiment, activation is achieved with rectification performed in a rectified linear unit (ReLU). As a result of the first pooling operation 1530, the imagery data is reduced to a reduced set of imagery data 1531a-1531c. For 2×2 pooling, the reduced set of imagery data is reduced by a factor of 4 from the previous set.

The previous convolution-to-pooling procedure is repeated. The reduced set of imagery data 1531a-1531c is then processed with convolutions using a second set of filters 1540. Similarly, each overlapped sub-region 1535 is processed. Another activation may be conducted before a second pooling operation 1540. The convolution-to-pooling procedures are repeated for several layers and finally connected to at least one Fully-connected (FC) layer 1560. In image classification, respective probabilities of predefined categories can be computed in FC layers 1560.

This repeated convolution-to-pooling procedure is trained using a known dataset or database. For image classification, the dataset contains the predefined categories. A particular set of filters, activation and pooling can be tuned and obtained before use for classifying an imagery data, for example, a specific combination of filter types, number of filters, order of filters, pooling types, and/or when to perform activation. In one embodiment, convolutional neural networks are based on Visual Geometry Group (VGG16) architecture neural nets, which contains 13 convolutional layers and three fully-connected layers.

Figure 16:
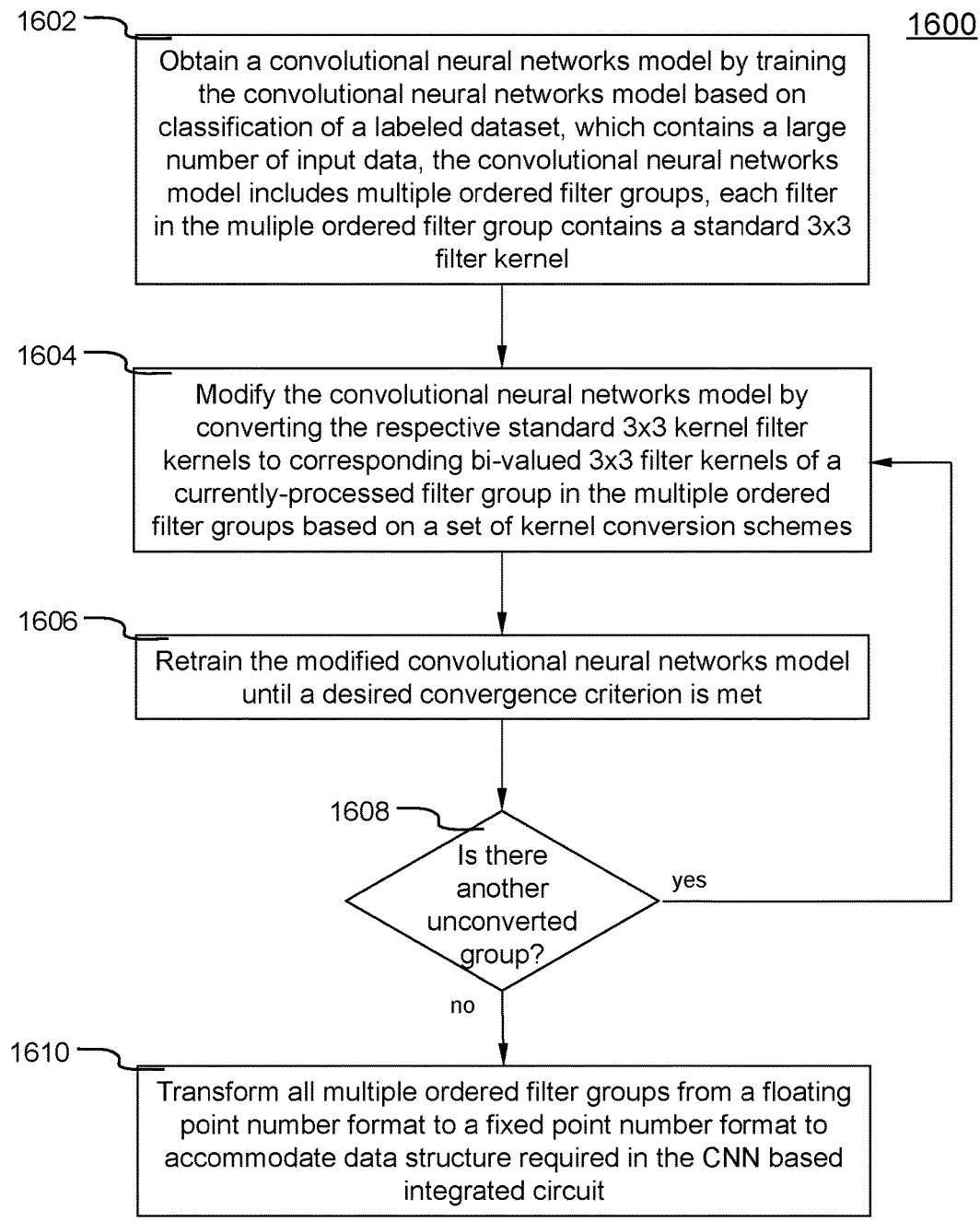
FIG. 16 is a flowchart illustrating an example process of achieving a trained convolutional neural networks model having bi-valued 3×3 filter kernels in accordance with an embodiment of the invention.
Figure 17:
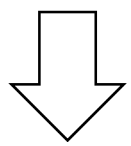
FIG. 17 is a diagram showing an example filter kernel conversion scheme in accordance with the invention.

A trained convolutional neural networks model is achieved with an example set of operations 1600 shown in FIG. 16. At action 1602, a convolutional neural networks model is first obtained by training the convolutional neural networks model based on image classification of a labeled dataset, which contains a sufficiently large number of input data (e.g., imagery data, converted voice data, optical character reorganization (OCR) data, etc.). For example, there are at least 4,000 data for each category. In other words, each data in the labeled dataset is associated with a category to be classified. The convolutional neural networks model includes multiple ordered filter groups (e.g., each filter group corresponds to a convolutional layer in the convolutional neural networks model). Each filter in the multiple ordered filter groups contains a standard 3×3 filter kernel (i.e., nine coefficients in floating point number format (e.g., standard 3×3 filter kernel 1710 in FIG. 17)). Each of the nine coefficients can be any negative or positive real number (i.e., a number with fraction). The initial convolutional neural networks model may be obtained from many different frameworks including, but not limited to, Mxnet, caffe, tensorflow, etc.

Then, at action 1604, the convolutional neural networks model is modified by converting respective standard 3×3 filter kernels 1710 to corresponding bi-valued 3×3 filter kernels 1720 of a currently-processed filter group in the multiple ordered filter groups based on a set of kernel conversion schemes. In one embodiment, each of the nine coefficients C(i,j) in the corresponding bi-valued 3×3 filter kernel 1720 is assigned a value 'A' equal to the average of absolute coefficient values multiplied by the sign of corresponding coefficients in the standard 3×3 filter kernel 1710 shown in following formula:

$$A = \sum_{1 \leq i, j \leq 3} |C(i, j)|/9 \qquad (2)$$

Filter groups are converted one at a time in the order defined in the multiple ordered filter groups. In certain situation, two consecutive filter groups are optionally combined such that the training of the convolutional neural networks model is more efficient.

Next, at action 1606, the modified convolutional neural networks model is retrained until a desired convergence criterion is met or achieved. There are a number of well known convergence criteria including, but not limited to, completing a predefined number of retraining operation, converging of accuracy loss due to filter kernel conversion, etc. In one embodiment, all filter groups including already converted in previous retraining operations can be changed or altered for fine tuning. In another embodiment, the already converted filter groups are frozen or unaltered during the retraining operation of the currently-processed filter group.

Process 1600 moves to decision 1608, it is determined whether there is another unconverted filter group. If 'yes', process 1600 moves back to repeat actions 1604-1606 until all filter groups have been converted. Decision 1608 becomes 'no' thereafter. At action 1610, coefficients of bi-valued 3×3 filter kernels in all filter groups are transformed from a floating point number format to a fixed point number format to accommodate the data structure required in the CNN based integrated circuit. Furthermore, the fixed point number is implemented as reconfigurable circuits in the CNN based integrated circuit. In one embodiment, the coefficients are implemented using 12-bit fixed point number format.

Figure 18:
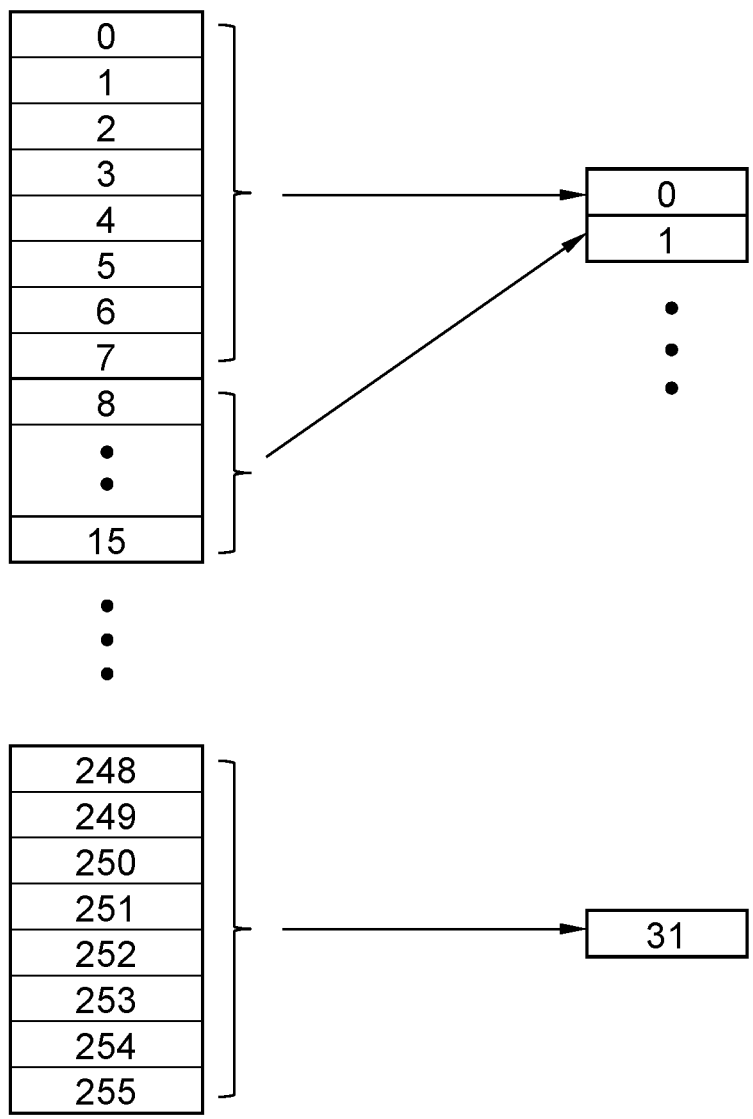
FIG. 18 is a diagram showing an example data conversion scheme.

FIG. 18 is a diagram showing an example data conversion scheme for converting data from 8-bit [0-255] to 5-bit [0-31] per pixel. For example, bits 0-7 becomes 0, bits 8-15 becomes 1, etc.

In another embodiment, entire set of coefficients can be trained on the CNN based integrated circuit. In other words, the conversion from full floating point number format to fixed point number format is not necessary. The coefficients of bi-valued 3×3 filter kernels are trained directly. Conversion from standard kernel to bi-value filter kernel is not required.

As described in process 1600 of FIG. 16, a convolutional neural networks model is trained for the CNN based integrated circuit. The entire set of trained coefficients or weights are pre-configured to the CNN based integrated circuit as a feature extractor for a particular data format (e.g., imagery data, voice spectrum, fingerprint, palm-print, optical character recognition (OCR), etc.). In general, there are many convolutional layers with many filters in each layer. In one embodiment, VGG16 model contains 13 convolutional layers. In a software based image classification task, computations for the convolutional layers take majority of computations (e.g., 90%) traditionally. This computations is drastically reduced with a dedicated hardware such as CNN based IC 100.

For better extracting features in different domains, like speech, face recognition, gesture recognition and etc, different sets of configured convolution layer coefficients are provided for that domain. And the particular set of convolution layers is used as a general feature extractor for the specific tasks in that domain. For example, the specific task of family members face recognition in the domain of face recognition, and the specific task of company employee face recognition also in the same domain of face recognition. And these two specific tasks can share the same set of convolution layers coefficients used for face detection.

There are a number of different types of deep neural networks. VGG networks include three layer types: convolutional, activation and pooling layers. MobileNet requires depthwise separable filters in additional to convolutional, activation and pooling.

Figure 19:
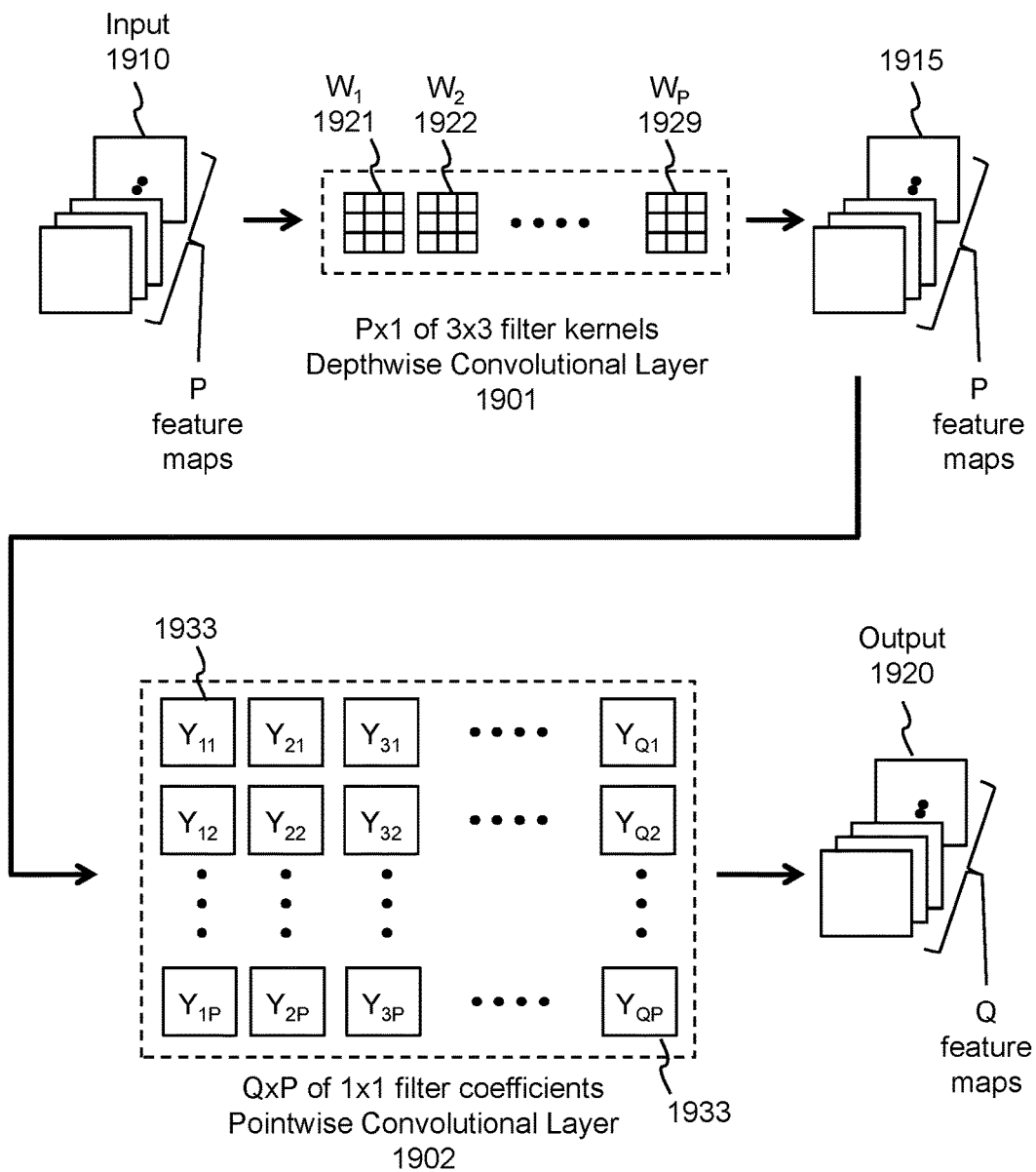
FIG. 19 is a schematic diagram showing example depth-wise separable filters in accordance with an embodiment of the invention.

FIG. 19 is a schematic diagram showing example depthwise separable filters that contain a combination of a depthwise convolutional layer 1901 followed by a pointwise convolutional layer 1902. Input 1910 and output 1920 contains P feature maps or channels, while the output 1920 contains Q feature maps. P and Q are positive integers (e.g., 16, 32, 64, 128, etc.) generally power of 2. Depthwise convolutional layer 1901 contains P×1 of 3×3 filter kernels ($W_1$ 1921, $W_2$ 1922, ..., $W_P$ 1929). Pointwise convolutional layer 1902 contains Q×P of 1×1 filter coefficients $Y_{11}$, $Y_{21}$, $Y_{31}$, ..., $Y_{Q1}$, $Y_{12}$, $Y_{22}$, ..., $Y_{Q2}$, ..., $Y_{1P}$, $Y_{2P}$, ..., $Y_{QP}$ 1933.

Figure 20A:
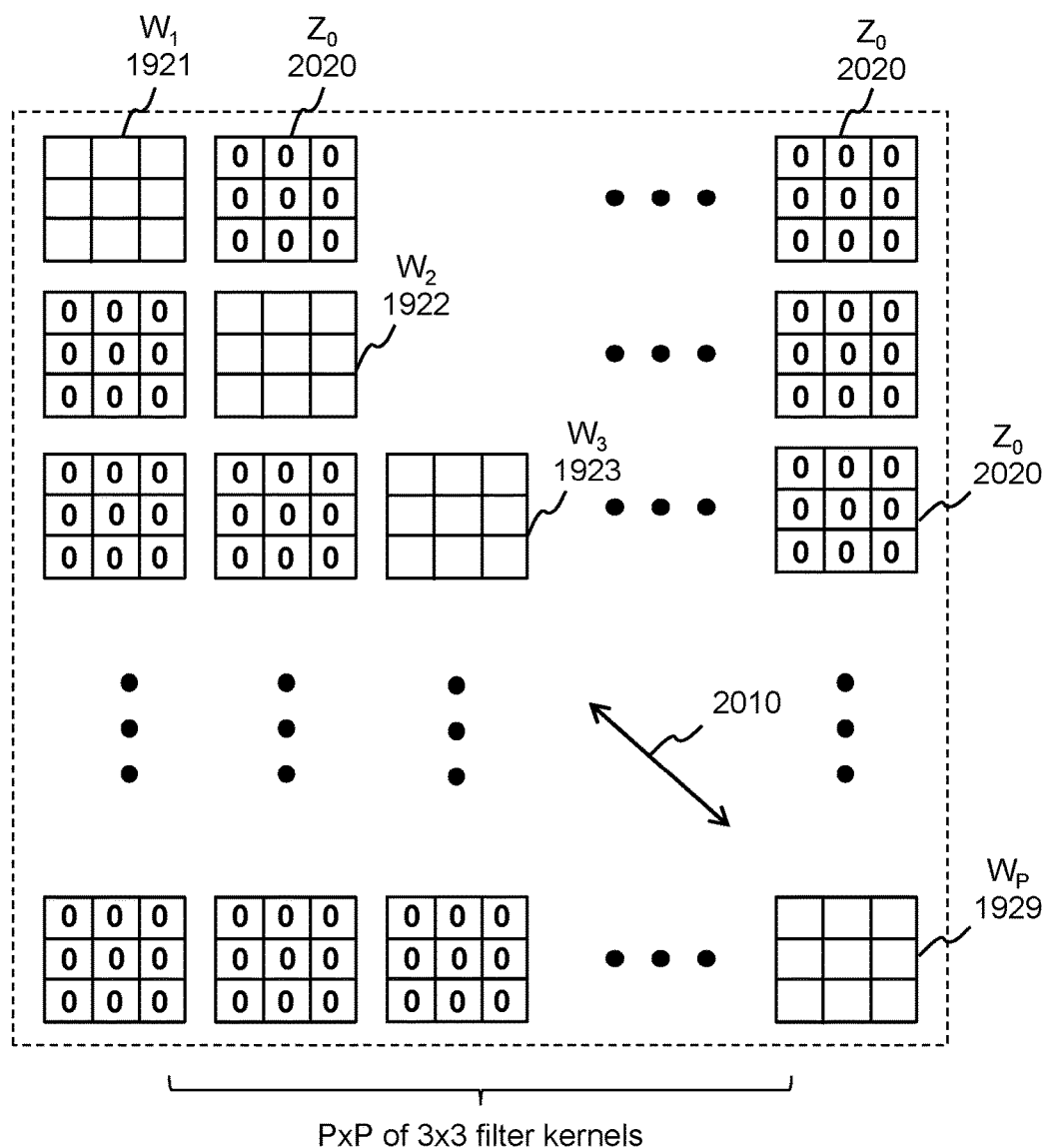
FIGS. 20A-20B are schematic diagrams showing example first and second replacement convolutional layers for replacing depthwise separable filters in accordance with an embodiment of the invention.
Figure 20B:
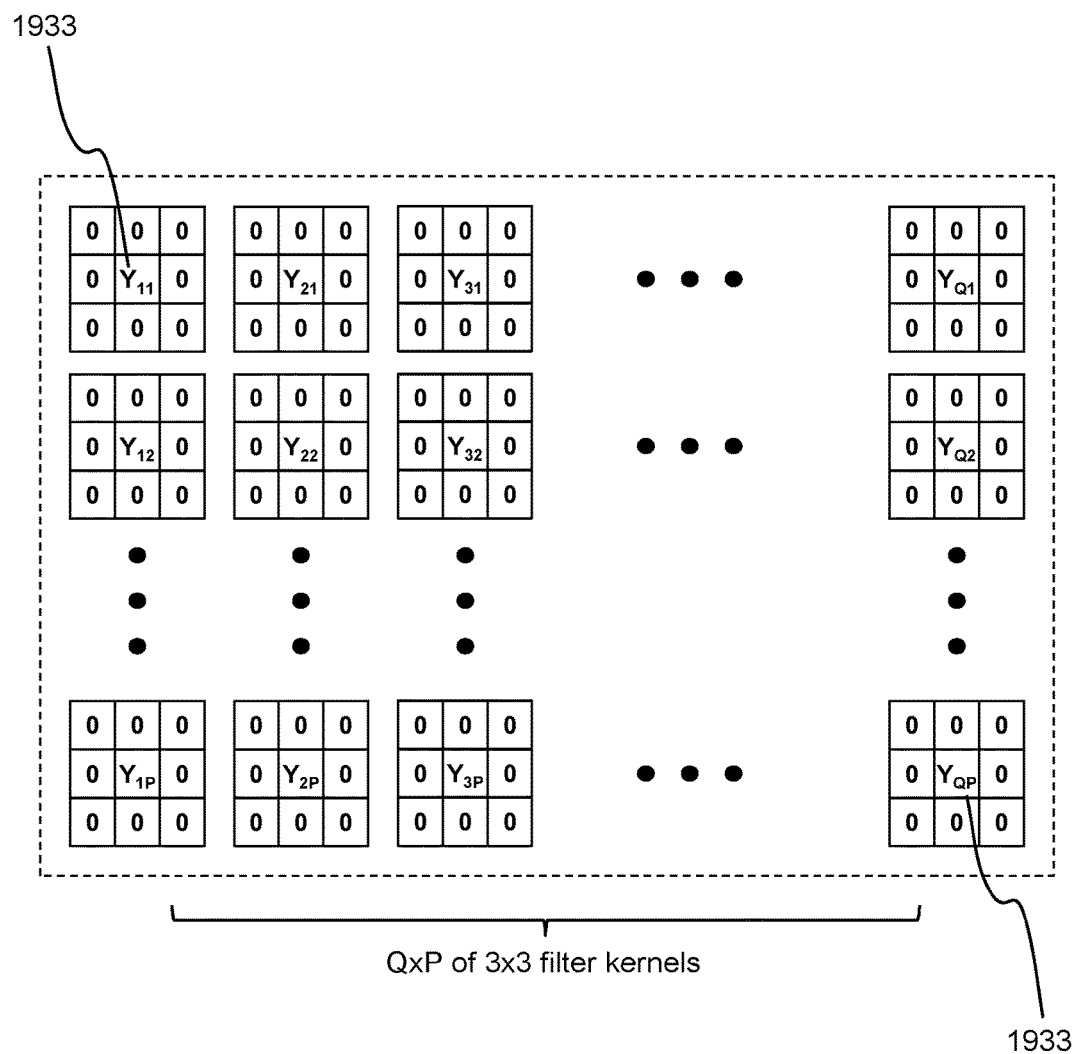

Because convolutional operations are conducted with very fast speed in the CNN based integrated circuit, operations of depthwise separable filters can be achieved with first and second replacement convolutional layers in accordance with one embodiment of the invention. FIGS. 20A-20B show an example first and second replacement convolutional layers.

FIG. 20A shows an example of the first replacement convolutional layer 2051, which contains P×P of 3×3 filter kernels formed by placing P×1 of 3×3 filter kernels ($W_1$ 1921, $W_2$ 1922, ..., $W_P$ 1929) of the depthwise convolutional layer 1901 on respective P diagonal locations 2010. The remaining off-diagonal locations of the P×P of 3×3 filter kernels are filled by zero-value 3×3 filter kernels $Z_0$ 2020. Each of the zero-value 3×3 filter kernels $Z_0$ 2020 contains numerical value zero in all nine positions. As a result, the first replacement convolutional layer 2051 is configured for replacing the depthwise convolutional layer 1901.

The second replacement convolutional layer 2052 shown in FIG. 20B contains Q×P of 3×3 filter kernels formed by placing the Q×P of 1×1 filter coefficients $Y_{11}$, $Y_{21}$, $Y_{31}$, ..., $Y_{Q1}$, $Y_{12}$, $Y_{22}$, ..., $Y_{Q2}$, ..., $Y_{IP}$, $Y_{2P}$, $Y_{QP}$ 1933 of the pointwise convolutional layer 2002 in center position of the respective Q×P of 3×3 filter kernels, and numerical value zero in eight perimeter positions. As a result, the second replacement convolutional layer 2052 is configured for replacing pointwise convolutional layer 1902.

Using input with 32 feature maps and output with 64 feature maps as an example, the first replacement convolutional layer 2051 would contain 32×32 of 3×3 filter kernels, and the second replacement convolutional layer 2052 would contain 64×32 of 3×3 filter kernels.

Although the invention has been described with reference to specific embodiments thereof, these embodiments are merely illustrative, and not restrictive of, the invention. Various modifications or changes to the specifically disclosed example embodiments will be suggested to persons skilled in the art. For example, whereas the input image has been shown and described as partitioning into M-pixel by M-pixel blocks in certain order, other orders may be used in the invention to achieve the same, for example, the ordering of the M-pixel by M-pixel blocks may be column-wise instead of row-wise. Furthermore, whereas M-pixel by M-pixel blocks have been shown and described using M equals to 14 as an example. M can be chosen as other positive integers to accomplish the same, for example, 16, 20, 30, etc. Additionally, activation layers (e.g., ReLU layers) for providing nonlinearity in depthwise separable filters have been omitted in the figures and descriptions because such activation layers can be equivalently conducted in replacement convolutional layers. Finally, whereas depthwise separable filters have been described and shown in MobileNet, other deep neural networks with depthwise separable filters can similarly be replaced with another particular set of 3×3 filter kernels. In summary, the scope of the invention should not be restricted to the specific example embodiments disclosed herein, and all modifications that are readily suggested to those of ordinary skill in the art should be included within the spirit and purview of this application and scope of the appended claims.

What is claimed is:

1. A digital integrated circuit for feature extraction comprising: a plurality of cellular neural networks (CNN) processing engines operatively coupled to at least one input/output data bus, the plurality of CNN processing engines being connected in a loop with a clock-skew circuit, each CNN processing engine comprising: a CNN processing block configured for simultaneously obtaining convolution operations results using input data and pre-trained filter coefficients of a plurality of convolutional layers, the convolutional layers containing first and second replacement convolutional layers for performing equivalent operations of depthwise separable filters that include a combination of a depthwise convolutional layer followed by a pointwise convolutional layer, wherein the depthwise convolutional layer contains P×1 of 3×3 filter kernels with an input containing P feature maps and an output containing Q feature maps, and wherein the first replacement convolutional layer contains P×P of 3×3 filter kernels formed by placing each of said P×1 of 3×3 filter kernels of the depthwise convolutional layer on respective P diagonal locations, and zero-value 3×3 filter kernels in all off-diagonal locations, where P and Q are positive integers; a first set of memory buffers operatively coupling to the CNN processing block for storing the input data; and a second set of memory buffers operative coupling to the CNN processing block for storing the pre-trained filter coefficients.

2. The digital integrated circuit of claim 1, wherein each of the zero-value 3×3 filter kernels contains numerical value zero in all nine positions.

3. A digital integrated circuit for feature extraction comprising:

a plurality of cellular neural networks (CNN) processing engines operatively coupled to at least one input/output data bus, the plurality of CNN processing engines being connected in a loop with a clock-skew circuit, each CNN processing engine comprising: a CNN processing block configured for simultaneously obtaining convolution operations results using input data and pre-trained filter coefficients of a plurality of convolutional layers, the convolutional layers containing first and second replacement convolutional layers for performing equivalent operations of depthwise separable filters that include a combination of a depthwise convolutional layer followed by a pointwise convolutional layer, wherein the depthwise convolutional layer contains P×1 of 3×3 filter kernels with an input containing P feature maps and an output containing Q feature maps, and the pointwise convolutional layer contains Q×P of 1×1 filter coefficients, and wherein the second replacement convolutional layer contains Q×P of 3×3 filter kernels formed by placing the Q×P of 1×1 filter coefficients of the pointwise convolutional layer in center position of the respective Q×P of 3×3 filter kernels, and numerical value zero in eight perimeter positions, where P and Q are positive integers; a first set of memory buffers operatively coupling to the CNN processing block for storing the input data; and a second set of memory buffers operative coupling to the CNN processing block for storing the pre-trained filter coefficients.

4. The digital integrated circuit of claim 1, wherein the depthwise separable convolutional layer is used in MobileNet.

5. The digital integrated circuit of claim 1, wherein the CNN processing block is further configured for performing operations of activation and pooling.

* * * * *